(12) United States Patent (10) Patent No.: US 8,990,524 B2
Kramer (45) Date of Patent: Mar. 24, 2015

(54) MANAGEMENT OF DATA ELEMENTS OF SUBGROUPS

(71) Applicant: Hewlett-Packard Development Company, L.P., Houston, TX (US)

(72) Inventor: Mykel John Kramer, Colorado Springs, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 239 days.

(21) Appl. No.: 13/628,474

(22) Filed: Sep. 27, 2012

(65) Prior Publication Data

US 2014/0089613 A1    Mar. 27, 2014

(51) Int. Cl.
G06F 12/00 (2006.01)
G06F 12/12 (2006.01)

(52) U.S. Cl.
USPC .......................................... 711/160; 711/134

(58) Field of Classification Search
USPC ....................................................... 711/160
See application file for complete search history.

(56) References Cited

U.S. PATENT DOCUMENTS

| | | | |
|---|---|---|---|
| 5,418,942 A | 5/1995 | Krawchuk et al. | |
| 5,881,311 A | 3/1999 | Woods | |
| 6,141,731 A * | 10/2000 | Beardsley et al. | 711/136 |
| 8,117,396 B1 * | 2/2012 | Fair et al. | 711/133 |
| 8,171,224 B2 * | 5/2012 | Luick | 711/122 |
| 8,407,419 B2 * | 3/2013 | Shea | 711/122 |
| 2002/0056025 A1 * | 5/2002 | Qiu et al. | 711/133 |
| 2003/0149843 A1 * | 8/2003 | Jarvis et al. | 711/133 |
| 2006/0136668 A1 * | 6/2006 | Rudelic | 711/118 |
| 2009/0132769 A1 * | 5/2009 | Pronovost et al. | 711/145 |
| 2010/0199036 A1 | 8/2010 | Siewert et al. | |
| 2011/0320436 A1 * | 12/2011 | Hokanson | 707/719 |
| 2012/0072656 A1 | 3/2012 | Archak et al. | |
| 2013/0046920 A1 * | 2/2013 | Ryu et al. | 711/103 |
| 2013/0232295 A1 * | 9/2013 | Benhase et al. | 711/103 |

OTHER PUBLICATIONS

EMC Corporation, Using EMC Fast Suite with Sybase ASE on EMC VNX Storage Systems, (Research Paper), Jun. 2011, http://www.emc.com/collateral/hardware/white-papers/h8256-fast-suite-sybase-vnx-wp.pdf, 21 pps.

Forney, Brian C., et al, Storage-Aware Caching: Revisiting Caching for Heterogeneous Storage Systems, Computer Sciences Dept., U. of Wisconsin, Madison, http://di.acm.org/citation.cfm?id=1973338, 14 pps.

* cited by examiner

*Primary Examiner* — Jared Rutz
*Assistant Examiner* — Edmund Kwong
(74) *Attorney, Agent, or Firm* — Hewlett-Packard Patent Department

(57) ABSTRACT

A plurality of subgroups with a least recently used (LRU) list of data elements associated with count variables. The LRU lists have a top entry to store a most recently used data element and a bottom entry to store a least recently used data element. If a data element is accessed, then increase the value of the count variable and move the accessed data element to the top entry of the LRU list of the subgroup associated with the data element. If the value of the count variable of the accessed data element of the top entry is greater than a value of a count variable of a data element of a bottom entry of a LRU list of a subgroup with a higher priority, then swap the data element of the bottom entry with the accessed data element of the top entry.

20 Claims, 20 Drawing Sheets

300
Subgroup 4
Size = 2
Shift Value = 1
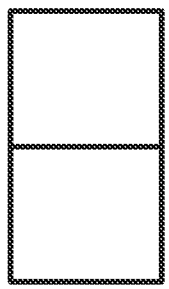
Subgroup 3
Size = 1
Shift Value = 2
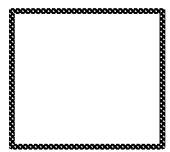
Subgroup 2
Size = 2
Shift Value = 1
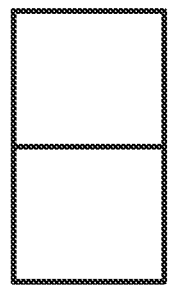
Subgroup 1
Size = 3
Shift Value = 2
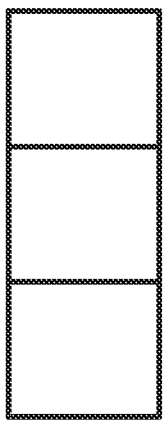
Minimum Distance Minimum = 2
Highest Value = 0
Minimum Distance Factor = .5
Minimum Distance = 0*(.5) = 0 => 2
*Fig. 3A*

300
Subgroup 4
Size = 2
Shift Value = 1
Subgroup 3
Size = 1
Shift Value = 2
Subgroup 2
Size = 2
Shift Value = 1
Subgroup 1
Size = 3
Shift Value = 2
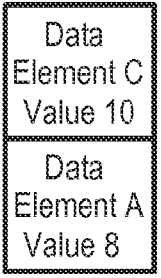
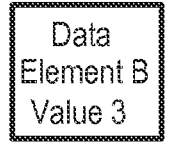
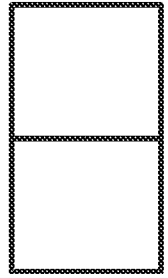
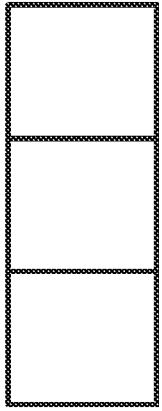
Minimum Distance Minimum = 2
Highest Value = 10
Minimum Distance Factor = .5
Minimum Distance = 10*(.5) = 5
Fig. 3G 300
Subgroup 4
Size = 2
Shift Value = 1
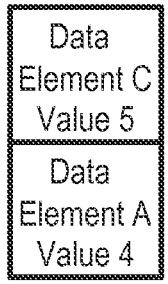
Subgroup 3
Size = 1
Shift Value = 2
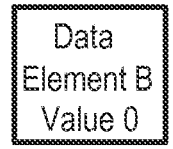
Subgroup 2
Size = 2
Shift Value = 1
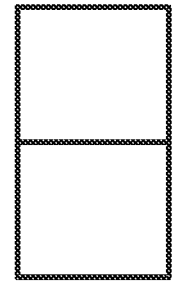
Subgroup 1
Size = 3
Shift Value = 2
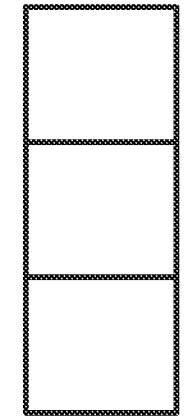
Minimum Distance Minimum = 2
Highest Value = 5
Minimum Distance Factor = .5
Minimum Distance = 5*(.5) = 2
*Fig. 3H*

300

| Subgroup 4 | Subgroup 3 | Subgroup 2 | Subgroup 1 |
|---|---|---|---|
| Size = 2 | Size = 1 | Size = 2 | Size = 3 |
| Shift Value = 1 | Shift Value = 2 | Shift Value = 1 | Shift Value = 2 |
| Data Element C Value 5 | Data Element B Value 0 | Data Element E Value 3 | Data Element H Value 2 |
| Data Element A Value 4 | | Data Element D Value 4 | Data Element G Value 4 |
| | | | Data Element F Value 1 |

Minimum Distance Minimum = 2
Highest Value = 5
Minimum Distance Factor = .5
Minimum Distance = 5*(.5) = 2

Subgroup 4
Size = 2
Shift Value = 1

| Data Element F Value 9 |
| Data Element C Value 5 |

Subgroup 3
Size = 1
Shift Value = 2

| Data Element A Value 4 |

Subgroup 2
Size = 2
Shift Value = 1

| Data Element B Value 0 |
| Data Element E Value 3 |

Subgroup 1
Size = 3
Shift Value = 2

| Data Element I Value 4 |
| Data Element D Value 4 |
| Data Element H Value 2 |

Minimum Distance Minimum = 2
Highest Value = 9
Minimum Distance Factor = .5
Minimum Distance = 9*(.5) = 4

Subgroup 4
Size = 2
Shift Value = 1

| Data Element F Value 4 |
| Data Element C Value 2 |

Subgroup 3
Size = 1
Shift Value = 2

| Data Element A Value 1 |

Subgroup 2
Size = 2
Shift Value = 1

| Data Element B Value 0 |
| Data Element E Value 1 |

Subgroup 1
Size = 3
Shift Value = 2

| Data Element D Value 1 |
| Data Element I Value 0 |
| Data Element H Value 0 |

Minimum Distance Minimum = 2
Highest Value = 4
Minimum Distance Factor = .5
Minimum Distance = 4*(.5) = 2

*Fig. 3Q*

MANAGEMENT OF DATA ELEMENTS OF SUBGROUPS

BACKGROUND

Electronic devices may include applications that have various data elements to support data processing for execution of the applications. The data elements may represent data objects such as entity or object names as part of the execution of the applications.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
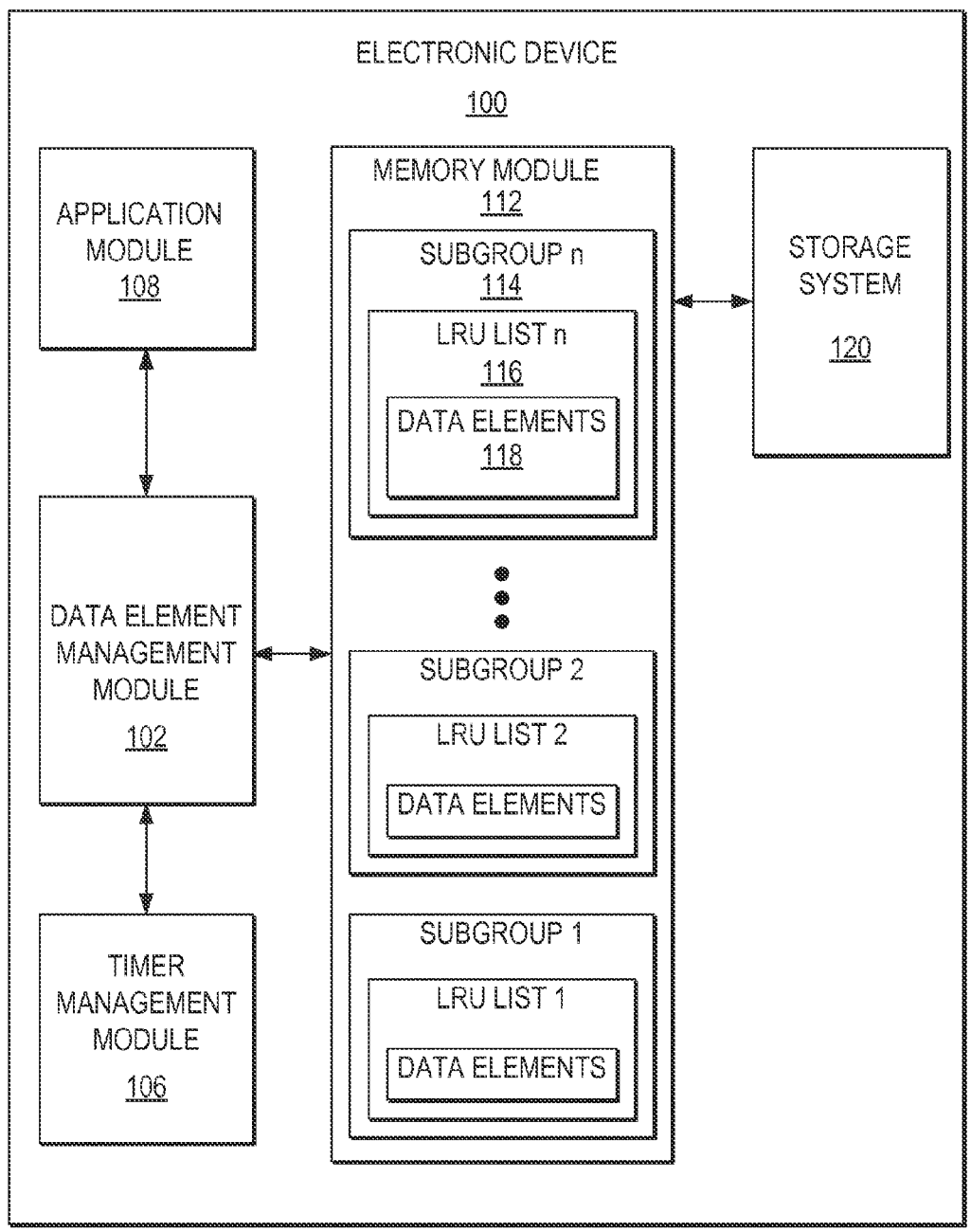
FIG. 1 is an example block diagram of an electronic device to manage data elements of subgroups.

As explained above, electronic devices may include applications that have various data elements to support data processing for execution of the applications. The data elements may represent data objects such as entity names or object names as part of the execution of the applications.

In one example, the present application discloses techniques to configure data structures of a group of data as plurality of subgroups having least recently used (LRU) lists with entries to support storage of data elements. The LRU list can have a top entry to store a most recently used data element and a bottom entry to store a least recently used data element. The subgroups can be configured in a manner such that higher numbered subgroups can have relative higher priority for processing than subsequent or lower numbered subgroups. The data elements can be associated with count variables which can track frequency of access or activity of the data elements. The techniques can check whether a data element has been accessed, and if a data element has been accessed, then it can perform an update process or operation on the accessed data element which can include updating the value of the count variable to indicate frequency of activity or access of the data element. The accessed data element can be added to the top of the LRU list of the associated subgroup. The techniques can compare data elements between different subgroups which can include checking whether the value of the count variable of the accessed data element of the top entry of the associated LRU is greater than a value of the count variable of a data element of a bottom entry of a LRU list of another subgroup. If the comparison operation determines such a case, then a swap operation can be performed which can include swapping the data element of the bottom entry with the accessed data element of the top entry. In another example, the techniques can periodically execute a process upon expiration of a time period. The process can include an update operation to adjust by a predefined amount, in one example decrease, at least one of the values of the count variables of the data elements of subgroups.

These techniques can provide a method of sorting data elements that takes into consideration the frequency of activity or access of the data elements and how recent the activity occurred. In one example, higher numbered or higher priority subgroups may have data elements representing higher access which may provide an indication of future processing. Such techniques may be applicable to various computing environments or applications. For example, in an automated tiered storage system, these techniques can be used to determine the manner in which to move data across different tiers (types) of storage devices and media. The movement of data between the different tiers may be performed in an automatic manner to the different types of storage media based on factors such as performance and capacity requirements. In one example, the data elements of the subgroups can be associated with data blocks to be stored in such an automated tiered storage system. The data blocks may be associated with higher priority subgroups which can be stored in faster access storage systems or tiers, relative to data blocks of lower priority subgroups which can be stored in slower access storage systems or tiers. The data blocks that are accessed the most frequently may be moved to higher priority subgroups which correspond to faster access storage system or tiers. Therefore, the techniques of the present application can provide a sort process in which the most accessed data elements are moved to faster access storage systems.

In one example, the present application can provide techniques to manage data elements of subgroups. The subgroups can be configured to include LRU lists which can support entries such as data elements that are associated with data such as count variables. In operation, each time a data element is accessed, the value of the count variable of the data element can be updated or incremented by a particular amount. The accessed data element can be moved from the current entry in the associated LRU list to the top entry of the associated LRU list. At that point in the process, if there is a higher numbered or higher priority LRU list of a subgroup, then the count variable of the accessed data element is compared with the count variable of the data element at the bottom entry on the next highest LRU of the subgroup. If the comparison is favorable, then a swap operation can be performed which may include moving the accessed data element from the top entry of the LRU list of the lowered numbered or lower priority subgroup to the top entry of the LRU list of the next highest numbered or higher priority subgroup, and then the data element from the LRU of the higher numbered or higher priority subgroup is moved to the top of the LRU list of the lower numbered or lower priority subgroup.

In another example, the techniques of the present application can include a background process that is configured to expire upon a time period or interval. When the time period expires, it can execute a periodic process that can include updating the value of the count variables of the data elements which can include shifting the value of the count variables by a bit count to the right. In the case of a bit count of one, this is equivalent to dividing the value of the count variable by 2. This process can help slowly age out relatively old values of count variables or increments, but still provide them with diminishing value. This may help avoid lowering the values of the data elements of subgroups that may have traditionally been incremented or updated often, but are experiencing a slower time environment. This may also help maintain current the value of the count variable and provide a better representation of the recent activity of the system to allow it to better respond to new behavior or activity patterns. In another example, the values of the count variable of data elements of the subgroups do not need to be updated or shifted by the same amount. For example, in a configuration with two subgroups, the higher numbered subgroup can have count variables of data elements shifted by and the lower numbered subgroup can have variables of data elements shifted by 2. In other words, the values of the count variables of the data elements of the higher numbered subgroup are divided by 2 whereas the values of the count variables of the data elements of lower numbered subgroup are divided by 4. This may provide the benefit of the doubt to data elements that reside in higher numbered subgroups if moving between subgroups were configured to be more conservative.

The techniques of the present application, to help reduce cost, and where applicable, may not require tracking all of the data elements or entries of the lowest numbered or lowest priority subgroup. For example, based on the problem or requirements of the application, it be may be more efficient to limit the size or number of entries of the LRU list of the lowest numbered or lowest priority subgroup. In this manner, values of the count variables of data elements that are not residing on any of the LRU lists can be initialized to values of one and placed at the top entry of the lowest numbered subgroup. If the number of entries of the LRU list of the lowest numbered subgroup becomes larger than its specified size, then the data element on the last or bottom entry of the LRU list can be removed or deleted from the list.

The techniques of the present application may exhibit various advantages. For example, if a system experiences a new activity pattern or behavior over a short period of time, then these techniques may accommodate these patterns and benefit from the sorting process and move the data elements over to higher priority subgroups temporarily. As the new activity pattern continues, the sorting process can detect these "active" data elements and move them over right away. This may allow the temporary activity pattern to achieve a more accurate sorting process profile as it continues to operate. When this new activity pattern lessens, then those data elements can be moved back to lower subgroups as they become less active or accessed. In this manner, where there are more "active" data elements than can be accommodated in higher priority subgroup space, this sorting process can move these data elements to high priority subgroups and adapt to these patterns. As new data elements are accessed often, they are moved over right away. For example, in an automated tiered storage application, when a different space area begins to be accessed more, then those data elements can be moved to faster access storage. This may also allow the system to maintain a more accurate sorting process even with small size limits on the higher subgroups. This is because the collective "active" data elements throughout the same time period of access pattern or behavior may not need to reside in the higher priority subgroups at the same time.

FIG. 1 is an example block diagram of an electronic device for management of data elements of subgroups. The electronic device 100 includes a data element management module 102, a timer management module 106, an application module 108, a memory module 112 and a storage system 120.

The data management module 102 can configure memory module 112 as a plurality of data structures that include a plurality of subgroups 114 such as Subgroups 1 through Subgroups n. The subgroups 114 can be configured to have LRU lists 116, such as LRU List 1 through LRU List n which can support data elements 118. The LRU lists 116 can have a top entry to store a most recently used data element and a bottom entry to store a least recently used data element. The LRU lists 116 can be configured with particular sizes to support particular number of entries to store data elements 118. For example, to illustrate, with reference to FIG. 3A, data element management module 102 can configure memory module 112 as Subgroup 300 having four subgroups: Subgroup 1, Subgroup 2, Subgroup 3 and Subgroup 4 to have LRU lists with one or more entries to store one or more data elements. For example, Subgroup 1 is shown configured to have an LRU list with 3 entries to store 3 data elements.

In one example, data element management module 102 can configure subgroups 114 in a manner such that each subgroup is to have a relative higher priority for processing than a subsequent lower priority subgroup. For example, to illustrate, with reference to FIG. 3A, data element management module 102 configures higher numbered Subgroup 4 to have a higher relative priority for processing than lowered numbered Subgroup 3, and Subgroup 3 to have a higher relative priority for processing than lower numbered Subgroup 2 and so on. In one example, higher priority for processing can mean that these subgroups and corresponding data elements are processed before lower priority subgroups.

The data element management module 102 can associate count variables with data elements 118 of subgroups. In one example, to illustrate, with reference to FIG. 3B, data element management module 102 associates Data Element A with a count variable to keep track of frequency of access or activity such as that provided by an application executing on electronic device 100 from application module 108. It should be understood that the configuration of Subgroup 300 is for illustrative purposes and that the techniques of the present application can be employed with other subgroup configurations. For example, data element management module 102 can configure Subgroup 300 to have a different number of subgroups and each subgroup to have the same LRU size, different LRU sizes or combination thereof.

The data element management module 102 can be configured to check whether data elements 118 of subgroups 114 have been accessed and perform some operation based on the result of the check process. To illustrate, in one example, with reference to FIG. 3B, data element management module 102 can check whether Data Element A has been accessed by an application such as from application module 108. If data management module 102 determines that a data element has been accessed, then the data management module can proceed to perform an update process on the accessed data element. For example, with reference to FIG. 3B, data element management module 102 can process Data Element A by updating or setting the value of the count variable to a value of 6 which can be based on or represent the frequency of access or activity experienced by the data element. The data management module 102 can move the accessed data element within the LRU list of the associated subgroup. For example, with reference to FIG. 3E, data element management module 102 can move Data Element A to the top of the LRU list of Subgroup 4 and move Data Element B to the bottom of the LRU list of Subgroup 4.

Once data element management module 102 performs this function or operation, the data element management module can proceed to compare data elements between different subgroups. For example, data element management module 102 can check whether the value of the count variable of the accessed data element of the top entry of the associated LRU is greater than the value of the count variable of a data element of a bottom entry of a LRU list of another subgroup. As explained above, data element management module 102 can configure the subgroups in a manner such that each subgroup is to have a relative higher priority for processing than a subsequent subgroup. Turning to FIG. 3F, data management module 102 can compare the value of the count variable of Data Element C of Subgroup 3, which has a value of 8, to the value of the count variable of Data Element B of Subgroup 4, which has a value of 3, of the associated LRU and determine whether to perform a swap operation. Once data element management module 102 determines to proceed to perform swap operation, it proceeds to swap a data element of the bottom entry with the accessed data element of the top entry, and then swap the data element of the bottom entry with the accessed data element of the top entry.

In one example, data element management module 102 can perform a swap operation that includes swapping data elements between two different subgroups. Continuing with the above example, to illustrate, turning to FIG. 3F, data element management module 102 determines that the count variable of Data Element C of Subgroup 3, which has a value of 8, is greater than the count variable of Data Element B of Subgroup 4, which has a value of 3, of the associated LRU and proceeds to initiate performing a swap operation. In this case, data element management module 102 proceeds to move Data Element C from the top of the LRU list of Subgroup 3 to the bottom of the LRU list of Subgroup 4. The data element management module 102 can then proceed to move Data Element B from the bottom of the LRU list of Subgroup 4 to the top of the LRU list of Subgroup 3. In this manner, the data element with the count variable with the highest value is moved to the next higher numbered subgroup with a higher relative priority for processing. In another example, data element management module 102 can compare data elements of subgroups using minimum distance factors which can based on percentage of highest value of the count variables of the data elements, as explained below in further detail with reference to FIGS. 3A through 3Q.

The timer management module 106 can be configured to periodically execute a process upon expiration of a time period. The process can include an update operation to adjust by a predefined amount at least one of the values of the count variables of the data elements of subgroups. In one example, the process can include an operation to decrease by different predefined amounts at least one of the values of the count variables of the data elements of different subgroups. In another example, the process can include an operation to decrease by a predefined amount at least one of the values of the count variables of the data elements of subgroups. In one example, the process can include an operation to decrease values of count variables of data elements of higher priority subgroups by a higher amount relative to values of count variables of data elements of lower priority subgroups.

The application module 108 can be configured to execute one or more applications based on the requirements of electronic device 100 or other requirements. For example, application module 108 can be configured to support an automated tiered storage application in conjunction with storage system 120. The storage system 120 may include a range of storage devices having a range of access speeds. It may be desirable to have data that is accessed most often stored in higher access speed storage devices compared to lower access speed storage devices. In one example, data element management module 102 can associate data elements with data blocks which can be stored in different tiers of storage system 120. In this case, data blocks of higher priority subgroups can be stored in faster access storage systems relative to data blocks of lower priority subgroups which can be stored in slower access storage systems.

The storage system 120 can include any means of storing data related to the operation of electronic device 100. For example, storage system 120 can be configured as an automated tiered storage system which includes automated movement of data across different tiers (types) of storage devices and media. The movement of data between the different tiers may be performed in an automatic manner to the different types of storage media based on factors such as performance and capacity requirements. In one example, data element management module 102 can be configured to associate data elements with data blocks to be stored in different tiers of storage system 120. In another example, the data blocks may be associated with higher priority subgroups that can be stored in faster access storage systems or tiers, relative to data blocks of lower priority subgroups which can be stored in slower access storage systems or tiers.

The electronic device 100 can be any computing device capable of processing data. The components of electronic device 100, including data element management module 102, timer management module 106, application module 108, memory module 112 and storage system 120 can be implemented in hardware, software or a combination thereof. The techniques of the present application implemented on electronic device 100 can be implemented on, for example, a server, a personal computer, a tablet, a notebook or any other computing device having a processor for executing instructions on a memory storage device or a combination thereof. The electronic device 100 can take one or more of several forms. Such forms may include a tablet, a personal computer, a workstation, a server, a handheld device, a consumer electronic device such as a video game console), or other, and can be a stand-alone device or configured as part of a computer network, computer cluster, cloud services infrastructure and the like or a combination thereof.

In an example hardware configuration, electronic device 100 can include a processor system having one or more processing units such as processors and memory. The processing units may include two or more processing cores on a chip or two or more processor chips. In some examples, the electronic device can also have one or more additional processing or specialized processors (not shown), such as a graphics processor for general-purpose computing on graphics processor units, to perform processing functions offloaded from the processor. The memory may be arranged in a hierarchy and may include one or more levels of cache. Depending on the configuration and type of electronic device, memory may be volatile such as random access memory (RAM), non-volatile such as read only memory (ROM), flash memory, etc., or some combination of the two.

The electronic device 100 may also include additional storage such as disk drives, optical drives, solid-state drives, and the like. Additionally, electronic device 100 can be configured to accept memory cards, optical discs, and the like as storage. The memory can include volatile and nonvolatile, removable and non-removable media implemented in any suitable method or technology for storage of information such as computer readable instructions, data structures, program modules or other data. Computer storage media can include RAM, ROM, EEPROM, flash memory or other memory technology, optical storage such as CD-ROM and digital versatile discs (DVD), magnetic storage devices such as magnetic tapes and magnetic disks, solid-state drives, flash storage devices such as universal serial bus (USB) flash drive and flash memory cards, or any other storage medium that can be used to store the desired information and that can be accessed by electronic device 100. Any such computer storage media may be part of electronic device 100.

The electronic device 100 can include input/output mechanisms to allow the electronic device to communicate external to the electronic device. The electronic device 100 can include one or more input/output connections, such as USB connections, display ports, proprietary connections, and others to connect with various devices to provide inputs and outputs to the electronic device. For example, electronic device 100 can include an output mechanism to provide information or data external to the electronic device and can include a graphical display device, an audio device, speakers, printer, a combination thereof or any other suitable output mechanism. In one example, an output mechanism can be used to allow a user to view information related to the operation of the device including performance of the device. In another example, electronic device 100 can include an input mechanism to allow the device to receive information or data external to the device and can include a keyboard, a touch input device, a pointing device such as a track pad and mouse, stylus, voice input device, a combination thereof or any other suitable input mechanism. In one example, an input mechanism can be used to allow a user to provide information to configure the operation of the device.

In another example, electronic device 100 can include a communication mechanism to allow the electronic device to communicate over communication connections, such as Ethernet, with other electronic devices and the like. In one example, electronic device 100 can include one or more communication connections to allow the electronic device to communicate with other electronic devices. Example communication connections can include Ethernet interfaces, wireless interfaces, bus interfaces, storage area network interfaces, proprietary interfaces and the like. The communication connections can be used to couple electronic device to a computer network, which can be classified according to a wide variety of characteristics such as topology, connection method, and scale. A computer network can include a collection of computing devices and possibly other devices interconnected by communications channels that facilitate communications and allows sharing of resources and information among the interconnected devices. Examples of computer networks include local area networks, wide area networks, the Internet, or other networks.

In one example, electronic device 100 can be configured as or part of a storage area network (SAN) system. The SAN system can include a network that can provide access to block level data storage. A SAN system can be configured with storage devices, such as disk arrays, tape libraries accessible to servers so that the devices appear a locally attached devices to the system. In another example, electronic device 100 can be configured as a storage network attached storage (NAS) device. The NAS system can provide file level computer data storage and can connect to a computer network providing data access to different groups of clients. The NAS system can operate as a file server and can be implemented using hardware, software, or configuration of those elements. The NAS system can include a network of appliances which can contain one or more hard drives which can be configured as logical, redundant storage containers or RAID arrays. In one example, the techniques of the present application can be used to manage and perform tasks related to movement of data between storage devices or tiers of storage devices. In another example, the techniques can be employed to implement tasks for performing automated tiered storage technology which can include automated movement of data across different tiers (types) of storage devices and media. The tasks can include automatic movement of data to different types of disk according to performance and capacity requirements.

Figure 2:
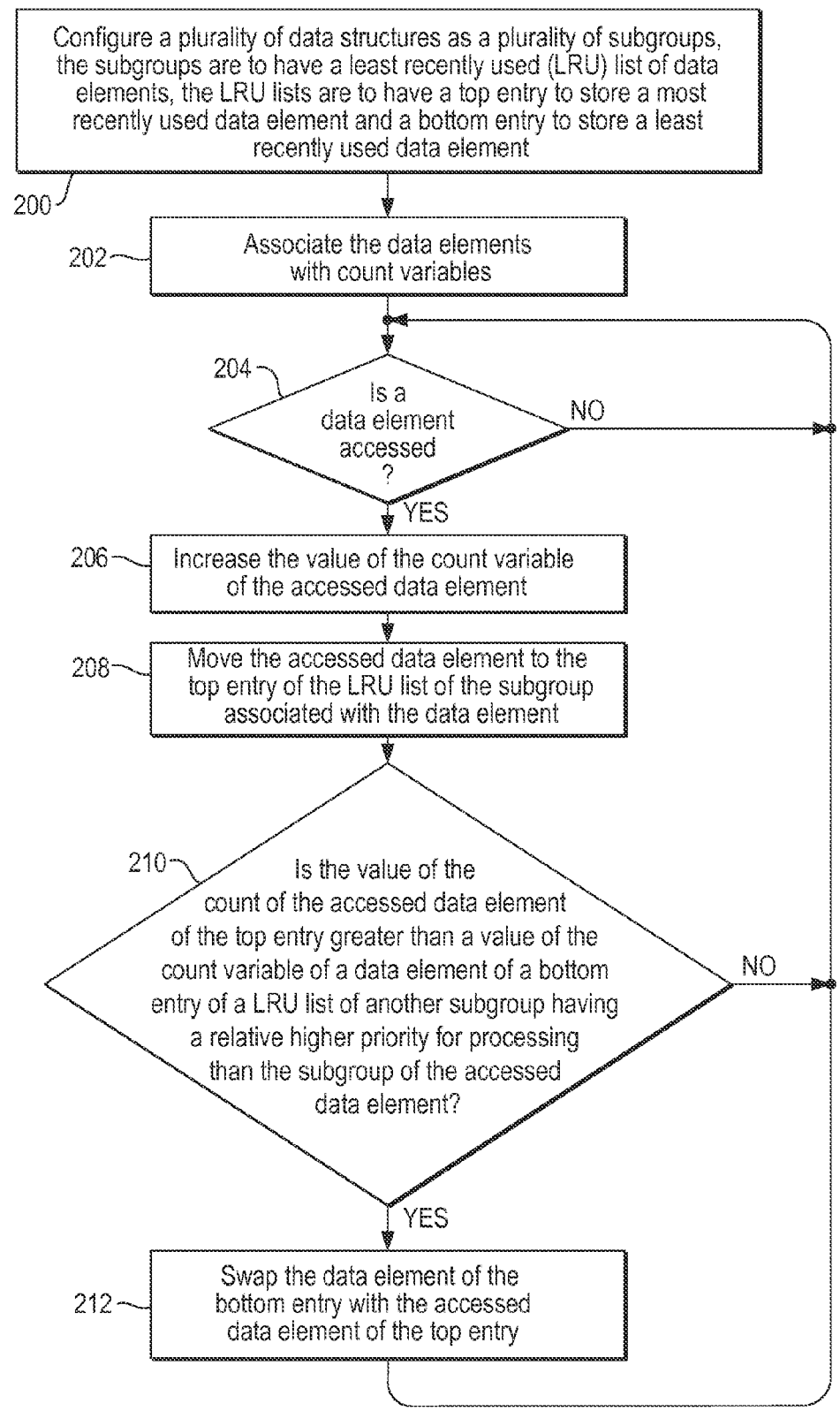
FIG. 2 is an example process flow diagram of a method of managing data elements of subgroups.

FIG. 2 is an example process flow diagram of a method of managing data elements of subgroups.

At block 200, electronic device 100 can configure memory module 112 as subgroups 114. In one example, to illustrate, it can be assumed that data element management module 102 can configure memory module 112 as plurality of data structures as a plurality of subgroups 114. The subgroups 114 can be configured to have LRU lists 116 with entries to store data elements 118. The LRU list 116 can have a top entry to store a most recently used data element and a bottom entry to store a least recently used data element. For example, to illustrate, with reference to FIG. 3A, data element management module 102 can configure memory module 112 as a Subgroup 300 having four subgroups: Subgroup 1, Subgroup 2, Subgroup 3 and Subgroup 4. The data element management module 102 can configure Subgroup 1, Subgroup 2, Subgroup 3 and Subgroup 4 to have LRU lists with one or more entries to store one or more data elements. For example, Subgroup 1 is shown configured to have an LRU list with 3 entries to store 3 data elements. The data element management module 102 configures the subgroups in a manner such that each subgroup is to have a relative higher priority for processing than a subsequent subgroup. For example, to illustrate, with reference to FIG. 3A, data element management module 102 configures higher numbered Subgroup 4 to have a higher relative priority for processing than lowered numbered Subgroup 3. In a similar manner, data element management module 102 configures higher numbered Subgroup 3 to have a higher relative priority for processing than lower numbered Subgroup 2 and so on.

At block 202, electronic device 100 associates count variables to data elements of subgroups. In one example, to illustrate, with reference to FIG. 33, data element management module 102 associates a count variable to Data Element A to keep track of frequency of access or activity by application module 108, for example. It should be understood that the configuration of subgroup 300 is for illustrative purposes and that the techniques of the present application can be employed with other subgroup configurations. For example, data element management module 102 can configure Subgroup 300 to have a different number of subgroups and configure each subgroup to have the same LRU size, different LRU sizes or combination thereof.

At block 204, electronic device 100 checks whether a data element has been accessed. To illustrate, in one example, with reference to FIG. 3B, data element management module 102 checks whether Data Element A has been accessed by electronic device such as from application module 108. If data management module 102 determines that a data element has not been accessed, then processing proceeds back to block 204 where the data management module continues to check or monitor whether a data element has been accessed. On the other hand, if data management module 102 determines that a data element has been accessed, then processing proceeds to block 206 as described below.

At block 206, electronic device 100 proceeds to process the data element that has been accessed. For example, continuing with the above example, with reference FIG. 3B, data element management module 102 processes Data Element A by updating the value of the count variable to a value of 6 which can be based on the frequency of access or activity. Once the data element management module 102 has processed the accessed data element, processing proceeds to block 208, as described below.

At block 208, electronic device 100 moves the accessed data element within the LRU list of the associated subgroup. For example, continuing with the above example, with reference FIG. 3B, data element management module 102 moves Data Element A to the top entry of the LRU list of Subgroup 4. In another example, continuing with the above example, with reference FIG. 3E, data element management module 102 moves Data Element A from the bottom entry of the LRU list to the top entry of the LRU list of Subgroup 4. Once this function or operation is performed, processing proceeds to block 210 where data element management module 102 proceeds to compare data elements between different subgroups.

At block 210, electronic device 100 compares data elements between different subgroups. In one example, data element management module 102 compares data elements between different subgroups. The data element management module 102 checks whether the value of the count variable of the accessed data element of the top entry of the associated LRU is greater than a value of the count variable of a data element of a bottom entry of a LRU list of another subgroup. As explained above, data element module 102 configures the subgroups in a manner that each subgroup is to have a relative higher priority for processing than a subsequent lower priority subgroup. For example, to illustrate, with reference to FIG. 3A, as explained above, data element management module 102 configures Subgroup 4 to have a higher relative priority for processing than Subgroup 3. In a similar manner, data element management module 102 configures Subgroup 3 to have a higher relative priority for processing than Subgroup 2 and so on. Turning to FIG. 3F, data management module 102 compares the count variable of Data Element C of Subgroup 3, which has a value of 8, to the count variable of Data Element B of Subgroup 4, which has a value of 3, of the associated LRU and determines whether a swap operation can be performed. Once data management module 102 determines such a case to swap a data element of the bottom entry with the accessed data element of the top entry, then processing proceeds to block 212 to perform this operation. On the other hand, if data element management module 102 determines that such a case is not present where a swap operation is not necessary, processing proceeds back to block 204 to continue to check for data elements being accessed.

At block 212, electronic device 100 swaps the data element of the bottom entry with the accessed data element of the top entry. In one example, data element management module 102 performs a swap operation that includes swapping data elements between two different subgroups. Continuing with the above example, to illustrate, turning to FIG. 3F, data element management module 102 determined that the count variable of Data Element C of Subgroup 3, which has a value of 8, is greater than the count variable of Data Element B of Subgroup 4, which has a value of 3, of the associated LRU and proceeds to initiate performing a swap operation. In this case, data element management module 102 proceeds to move Data Element C from the top of the LRU list of Subgroup 3 to the bottom of the LRU list of Subgroup 4. The data element management module 102 then proceeds to move Data Element B from the bottom of the LRU list of Subgroup 4 to the top of the LRU list of Subgroup 3. In this manner, the data element with the highest value count variable is moved to the next higher numbered subgroup with a higher relative priority subgroup for processing. Once the data element module 102 swaps the data element of the bottom entry with the accessed data element of the top entry, processing proceeds back to block 204 to continue to check for data elements being accessed.

Although not shown in the process of FIG. 2, electronic device 100 can configure timer management module 106 to periodically execute a process upon expiration of a time period. The process can include executing an update operation to adjust by a predefined amount at least one of the values of the count variables of the data elements of subgroups. For example, to illustrate, with reference to FIG. 3Q, timer management module 106 is configured to periodically execute a data element update operation to adjust by a predefined amount a least by a predefined amount all of the data elements of Subgroup 300.

FIGS. 3A-3Q are example diagrams showing operation of management of data elements of subgroups. In one example, the process of managing or operating Subgroup 300 includes performing a series of operations for managing Subgroup 300 as shown in the sequence illustrated in FIG. 3A through FIG. 3Q and as described in detail below. It should be understood that this sequence of operations is for illustrative purposes and that a different sequence of operations can be employed by the techniques of the present application.

FIG. 3A shows initialization of Subgroup 300 with data elements of subgroups for management by electronic device 100 of FIG. 1. In one example, to illustrate, it is assumed the data element management module 102 configures memory module 112 as Subgroup 300 with four subgroups: Subgroup 1, Subgroup 2, Subgroup 3 and Subgroup 4. The Subgroup 1 is configured to have a Size of 3 which indicates that it includes a LRU list with 3 entries to store a total number of 3 data elements. The Subgroup 2 and Subgroup 4 are configured to have a Size of 2 which indicates that they include a LRU list with 2 entries to store a total number of 2 data elements. The Subgroup 3 is configured to have a Size of 1 which indicates that it includes an LRU list with 1 entry to store a total number of 1 data element. A shown in FIG. 3A, Subgroup 300 is empty, in other words, it has no data elements stored in Subgroup 1, Subgroup 2, Subgroup 3 and Subgroup 4.

It will be assumed, to illustrate, that timer management module 106 will be configured to periodically execute a data element update operation to adjust, in this case, decrease, by a predefined amount at least by a predefined amount data elements of Subgroup 300. The data element management module 102 assigns or associates a shift variable to all of the subgroups of Subgroup 300: Subgroup 1, Subgroup 2, Subgroup 3 and Subgroup 4. The timer management module 106 uses the shift variable to shift the value of the count variables of the data elements by the value of the shift variable. In this case, Subgroup 2 and Subgroup 4 are assigned a shift variable value of 1 which means that the value of the count variable is shifted to the right by one bit, in effect, dividing the value of the count variable by 2. In addition, in this case. Subgroup 1 and Subgroup 3 are assigned a shift variable value of 2 which means that the value of the count variable is shifted to the right by two bits, in effect, dividing the value of the count variable by 4. In this example integer values were used for the shift variables, but it should be understood that decimal values could have been used to employ the techniques of the present application. In addition, it should be understood that the values of the shift variables can be other values. The shift variables can be based on the requirements of electronic devices 100 such as from application module 108 or other requirements, for example.

The data element management module 102 configures the subgroups in a manner that each subgroup is to have a relative higher priority for processing than a subsequent subgroup. For example, to illustrate, data element management module 102 configures Subgroup 4 to have a higher relative priority for processing than Subgroup 3. In a similar manner, data element management module 102 configures Subgroup 3 to have a higher relative priority for processing than Subgroup 2 and so on.

The data element management module 102 provides and configures several distance type factors or variables for processing the data elements during operation. For example, data element management module 102 provides a Minimum Distance variable, a Minimum Distance factor, a Minimum Distance Minimum variable, and a Highest Value variable. The Minimum Distance variable is to have a value such that a count variable of a data element must exceed to be able to be swapped to another subgroup. The Minimum Distance factor represents a factor having a value based on the requirements of electronic device 100 such as from application module 108 or other requirements, for example. In this case, the value of the Minimum Distance factor is set to a value of 0.5. However, it should be understood the Minimum Distance factor can be set to another value based on the requirements of the application module 108 or other requirements, for example. The Highest Value variable is used by data element management module 102 to keep track of the highest value of the count variable of the data elements. In this case, since the operation is in the initialization state and there are no data elements present, the value of the Highest Value is set to a value of zero (0). The Minimum Distance variable is calculated and is equal to the Highest Value variable multiplied by the Minimum Distance factor. In this case, the Minimum Distance variable is equal 0 which is the result of the Highest Value variable (in this case, 0) multiplied by the Minimum Distance factor (0.5). In addition, the Minimum Distance Minimum variable is used by data element management module 102 to prevent the Minimum Distance variable from having a value lower than the value of the Minimum Distance Minimum variable. In this case, as an example, the Minimum Distance Minimum variable is set to a value of 2.0. In this case, the Minimum Distance variable is set to a value of 2 instead of the calculated value of zero (0) above.

It should be understood that the configuration of Subgroup 300 is for illustrative purposes and that other configurations are possible. For example, Subgroup 300 can be configured as a different number of subgroups other than 4 subgroups and each subgroup can be configured to have the same or a different size LRU list.

Figure 3B:
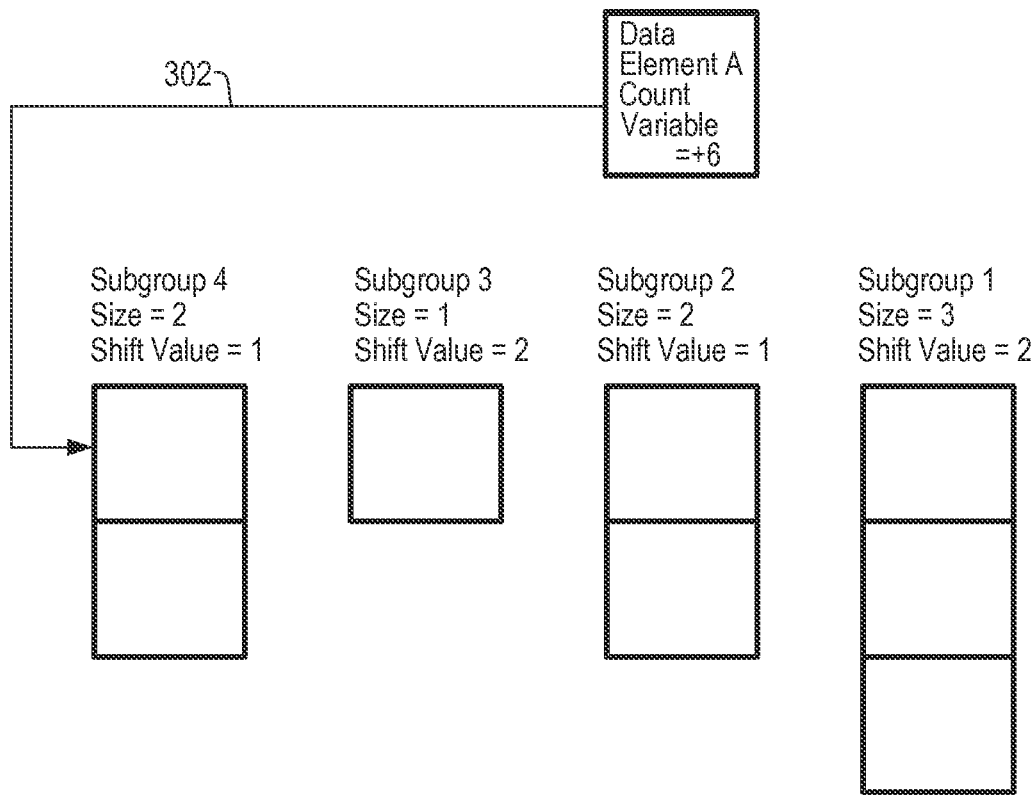
FIGS. 3A-3Q are example diagrams showing operation of managing data elements of subgroups.

FIG. 3B shows a further step in the operation of Subgroup 300 with data elements of subgroups for management by electronic device 100 of FIG. 1. To illustrate, in one example, it is assumed that data element management module 102 receives Data Element A and the associated count variable is assigned a value of 6. The data element management module 102 places Data Element A onto the top entry of the LRU list of Subgroup 4 (shown by arrow 302). In one example, since Subgroup 300 is empty, data element management module 102 first places data elements in empty entries of the LRU lists of empty subgroups. The data element management module 102 performs this process starting with the highest numbered subgroups (highest priority) and continuing to lower numbered subgroups (lower priority). Unless a data element is removed from Subgroup 300, the process includes checking that there are no empty entries to the left of a subgroup which is nonempty (lower numbered subgroups).

Figure 3C:
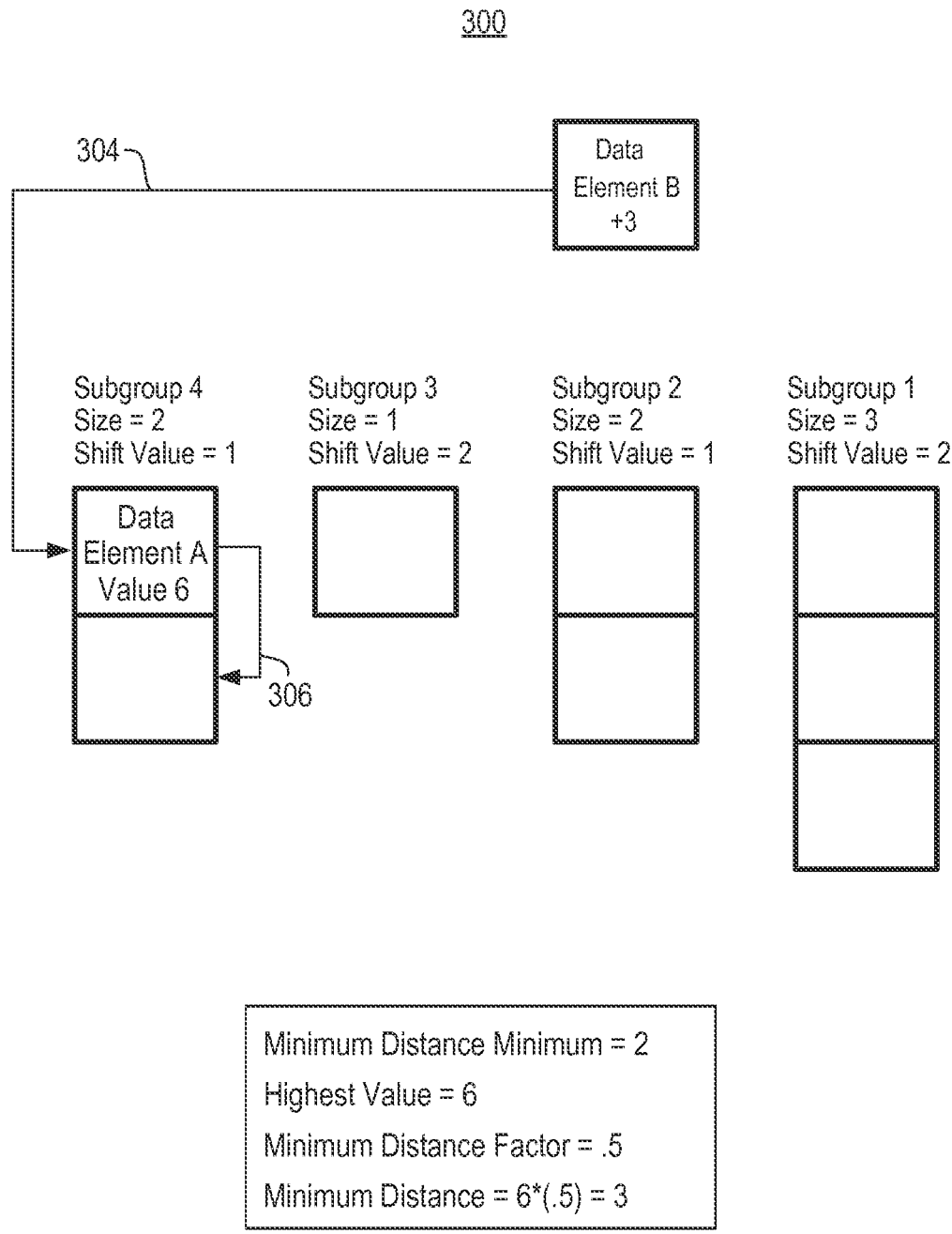

FIG. 3C shows a further step in the operation of Subgroup 300 with data elements of subgroups for management by electronic device 100 of FIG. 1. As shown, data element management module 102 placed Data Element A onto the top entry of the LRU list of Subgroup 4. As a result of receiving Data Element A, the value of the Highest Value variable is updated to a value of 6 which is the value of the count variable of Data Element A. Accordingly, the value of the Minimum Distance variable is updated to a value of 3 which is the result of the value of the Highest Value variable (value 6) multiplied by the value of the Minimum Distance factor (value 0.5). Next, to illustrate the process, it is assumed that data element management module 102 receives another data element, Data Element B, and the value of the associated count variable is 3. The data element management module 102 places Data Element B onto the top entry of the LRU list of Subgroup 4 (shown by arrow 304), since there is an empty entry in Subgroup 4. As explained below in further detail, data element management module 102 moves Data Element A from the top entry to the bottom entry of the LRU list of Subgroup 4 (shown by arrow 306).

Figure 3D:
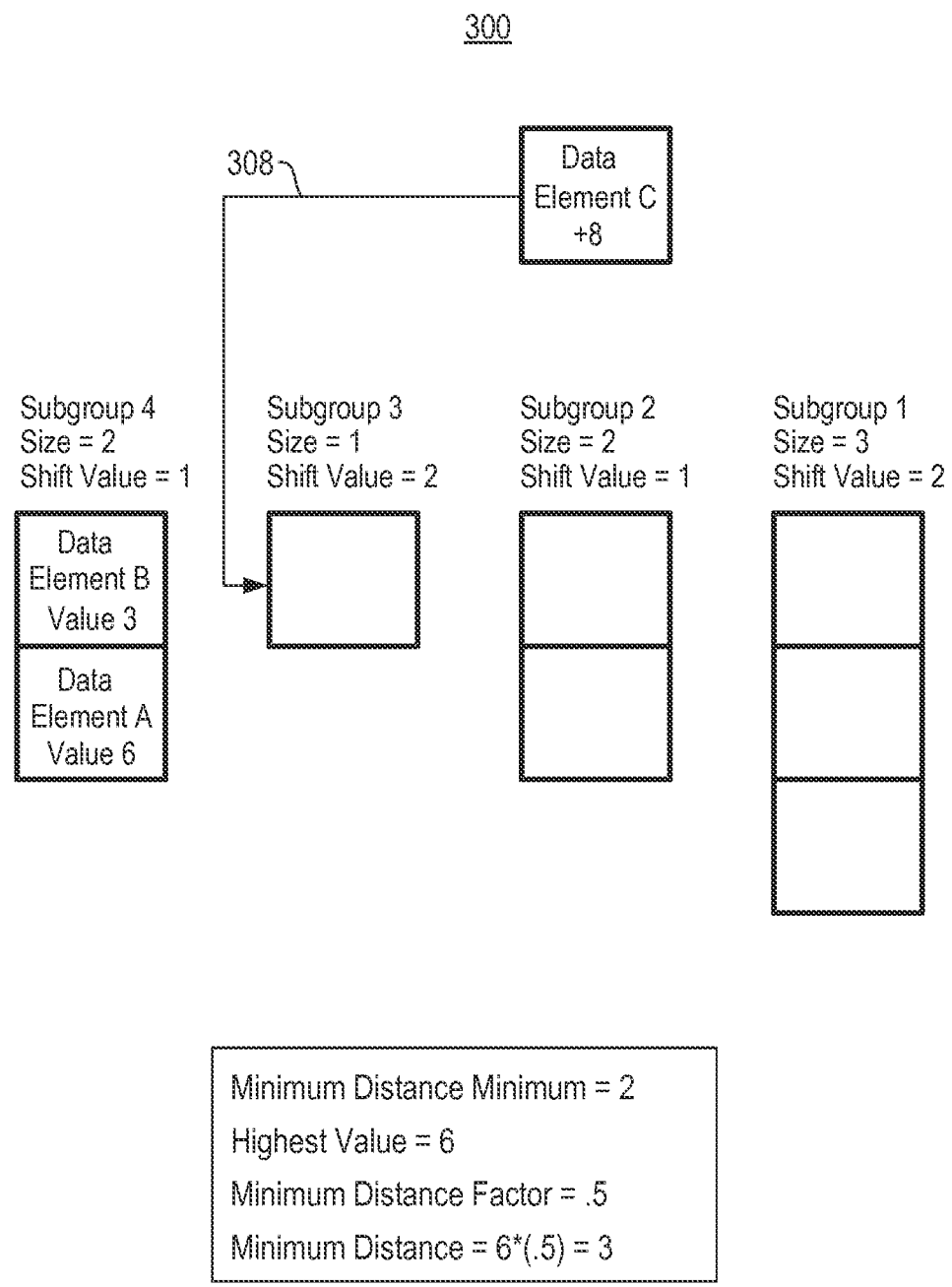

FIG. 3D shows a further step in the operation of Subgroup 300 with data elements of subgroups for management by electronic device 100 of FIG. 1. As shown, data element management module 102 places Data Element B onto the top entry of the LRU list of Subgroup 4. Although the value of the count variable of Data Element A (value 6) is greater than the value of the count variable of Data Element B (value 3), data element management module 102 places Data Element B on the top entry of the Subgroup 4 because it is configured as a LRU list in which placement of data elements are made to the top of the LRU list based on most recently used data elements. In this case, Data Element B is the most recently used data element and thus is placed on the top entry of the Subgroup 4.

Next, to illustrate the process, it is assumed that data element management module 102 receives another data element, Data Element C, and the value of the associated count variable is incremented to 8. The data management module 102 places Data Element C onto the top entry of the LRU list of Subgroup 3 (shown by arrow 308), since the next empty or available entry is in Subgroup 3. Although the value of the count variable of Data Element C (value 8) is greater than the value of the count variable of Data Element B (value 3) and Data Element A (value 6), data management module 102 does not perform a comparison operation that would include comparing data elements between different subgroups. A comparison operation is not performed, at this point in the process, because the data elements have been newly received.

Figure 3E:
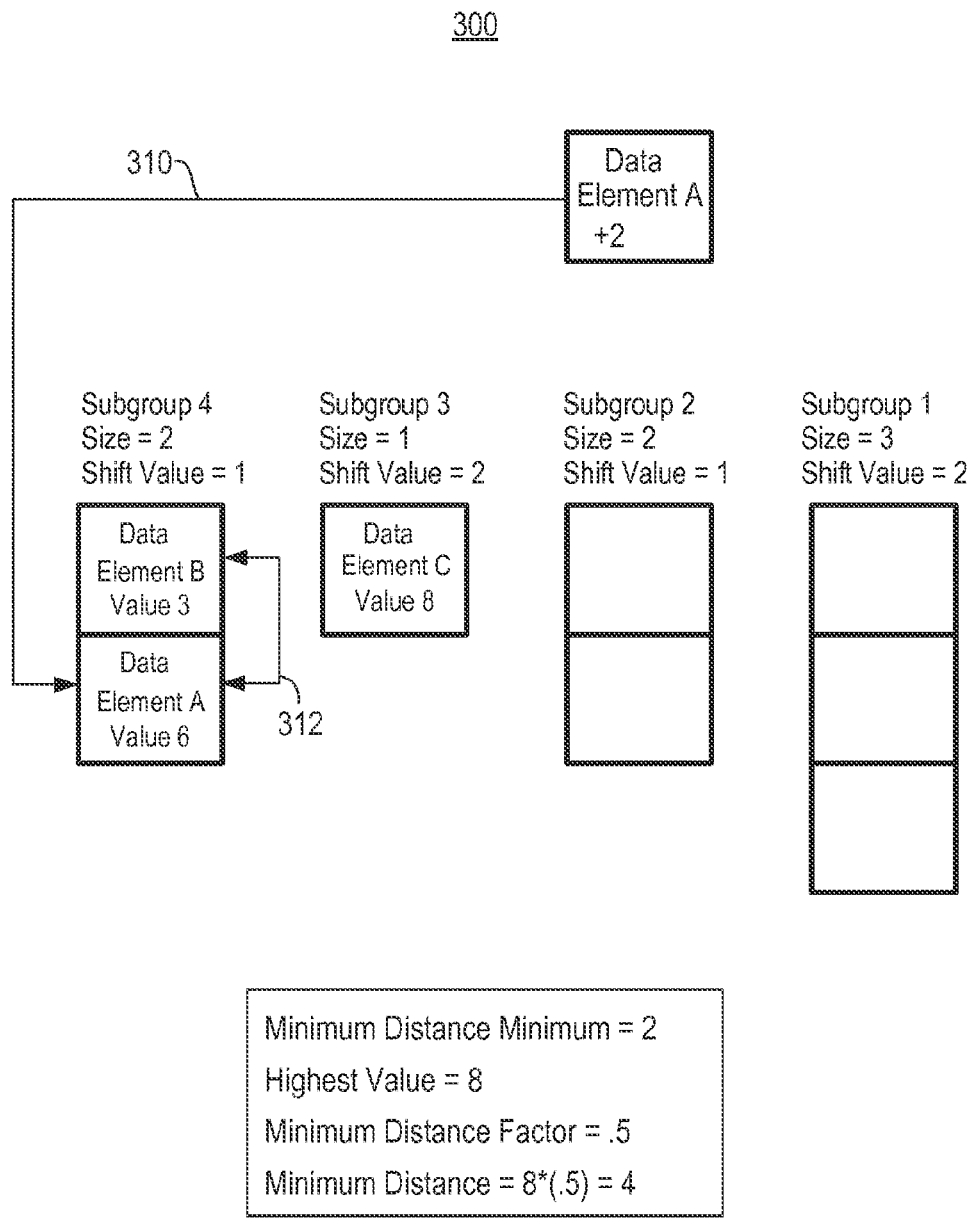
Figure 3F:
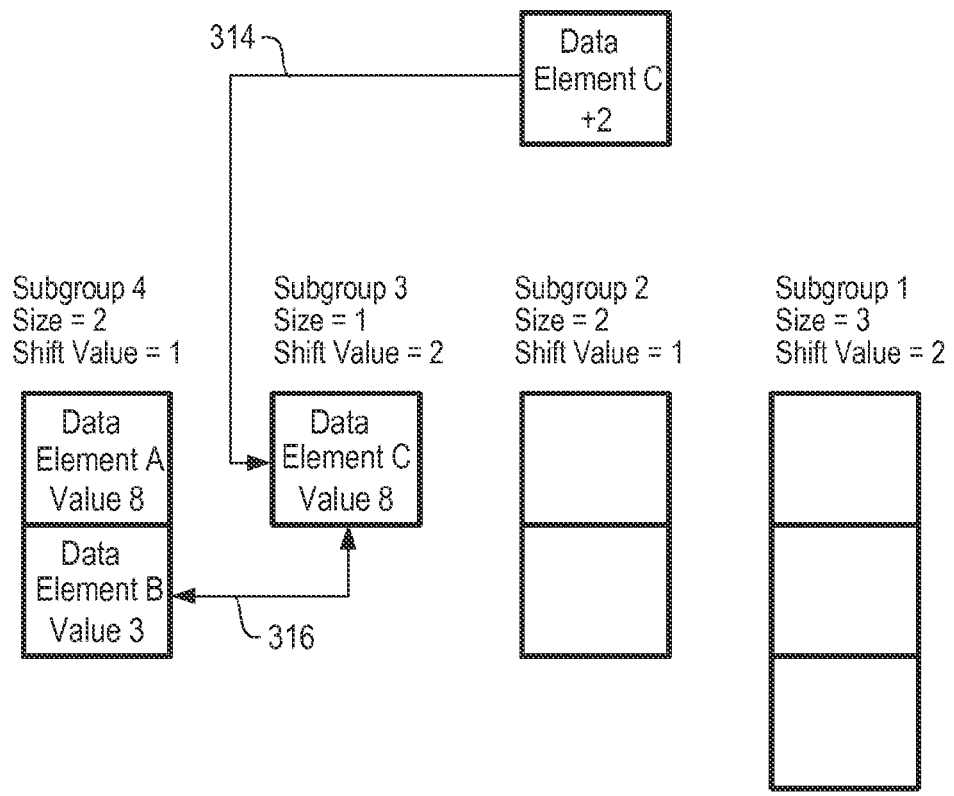

FIG. 3E shows a further step in the operation of Subgroup 300 with data elements of subgroups for management by electronic device 100 of FIG. 1. As shown, data element management module 102 placed Data Element C to the top entry (actually the only entry) of the LRU list of Subgroup 3. In addition, data element management module 102 did not find it necessary to further process Data Element A and Data Element B in Subgroup 4.

In addition, when data element management module 102 placed Data Element C on the top entry of Subgroup 3, the data management module had the opportunity to compare Data Element C with Data Element A which is the data element residing at the lowest entry of the Subgroup 4. Although the value of the count variable of Data Element C (value 8) is greater than the value of the count variable of Data Element A (value 6), data element management module 102 takes into consideration distance factors when comparing two data elements between subgroups. For example, data element management module 102 updates the value of the Highest Value variable (value 8) to reflect the value of the count variable of the most recent data element, which, in this case, is the value of 8 of Data Element C. The data element management module 102 then adjusts the Minimum Distance variable to a value of 4 which is the result of the multiplication of the Minimum Distance factor (value of 0.5) with the Highest Value (value of 8). The data element management module 102 then proceeds to compare the value of the count variable of Data Element C (value of 8) with the total distance value of 10 (6+4) which is the combination of the value of Data Element A (value of 6) and the value of the Minimum Distance variable (value of 4). In this case, since the value of the total distance (10=6+4) is greater than the value of the count variable of Data Element C (value of 6), data management module 102 leaves Data Element C in Subgroup 3. In other words, data element management module 102 does not swap Data Element C of Subgroup 3 with Data Element A of Subgroup 4.

Next, to illustrate the process, it is assumed that data element management module 102 updates the value of the count variable, actually increments by 2, of Data Element A (as shown by arrow 310). This results in increasing the total value of the count variable of Data Element A from 6 to 8. As shown, Data Element A resides in Subgroup 4 and there is no higher priority subgroup than Subgroup 4 and therefore data management module is not able to move Data Element A to a higher priority subgroup. In this case, data element management module 102 moves Data Element A up to the top entry of the LRU list of Subgroup 4 and moves Data Element B down to the bottom entry of the LRU list of Subgroup 4 (as shown by arrow 312) because Data Element A is the most recently used data element.

FIG. 3F shows a further step in the operation of Subgroup 300 with data elements of subgroups for management by electronic device 100 of FIG. 1. Next, to illustrate the process, it is assumed that data element management module 102 updates the value of the count variable, actually increments by 2, of Data Element C (as shown by arrow 314). This results in increasing the total value of the count variable of Data Element C from 8 to 10. Data Element C resides in Subgroup 3 which has a single entry LRU list and thus it is not possible for data element management module 102 to move Data Element C to a higher entry of the LRU list.

However, it is possible for data management module 102 to compare Data Element C of Subgroup 3 to Data Element B of Subgroup 4 and thus possibly swap these two data elements. Although the value of the count variable of Data Element C (value 10) is greater than the value of the count variable of Data Element B (value 3), data element management module takes into consideration distance factors when comparing two data elements between subgroups. For example, data element management module 102 updates the value of the Highest Value variable (value 10) to reflect the value of the count variable of the most recent data element, which, in this case, is the value of 10 of Data Element C. The data element management module 102 then adjusts the Minimum Distance variable to a value of 5 which is the result of the multiplication of the Minimum Distance factor (value 0.5) with the Highest Value (value of 10). The data element management module 102 then proceeds to compare the value of the count variable of Data Element C (value of 10) with the total distance value of 8 (3+5) which is the combination of the value of Data Element B (value of 3) and the value of the Minimum Distance variable (value of 5). In this case, data management determines that the value of the total distance (8=3+5) is less than the value of the count variable of Data Element C (value of 10). In this case, data element management module 102 moves Data Element C from Subgroup 3 to the bottom entry of the LRU list of Subgroup 4 and moves Data Element B from the bottom entry of the LRU list of Subgroup 3 to the top (only entry) of the LRU list of Subgroup 3 (as shown by arrow 316). In other words, data element management module 102 swaps Data Element C of Subgroup 3 with Data Element B of Subgroup 4. As part of the process, data element management module 102 moves Data Element B to the top entry of the LRU list of Subgroup 4 because each new data element placed in a LRU list is moved to the top entry of the LRU list.

FIG. 3G shows a further step in the operation of Subgroup 300 with data elements of subgroups for management by electronic device 100 of FIG. 1. As shown, data element management module 102 placed Data Element C on the top entry of the LRU list of Subgroup 4 and placed Data Element B on the top entry (only entry) of the LRU list of Subgroup 3.

Next, to illustrate the process, it is assumed that timer management module 106 executes an update operation to decrease by a predefined amount the values of the count variables of the data elements of subgroups. In this case, the value of the count variable of Data Element C is 10 and timer management module 106 process proceeds to shift the value of the count variable of Data Element C by 1 bit to the right, in effect dividing the value of 10 by 2, resulting in a count variable value of 5. Continuing with the example, the value of the count variable of Data Element A is 8 and timer management module 106 process proceeds to shift the value of the count variable of Data Element A by 1 bit to the right, in effect dividing the value of 8 by 2, resulting in a count variable value of 4. In a similar manner. In this case, the value of the count variable of Data Element B is 3 and timer management module 106 process proceeds to shift the value of the count variable of Data Element B by 2 bits to the right, in effect dividing the value of 3 by 4, resulting in a count variable value of zero (0).

FIG. 3H shows a further step in the operation of Subgroup 300 with data elements of subgroups for management by electronic device 100 of FIG. 1. As shown, after the timer management module 106 updated the count variable of Data Element A from a value of 8 to 4, Data Element B from a value of 3 to 0 and Data Element C from a value of 10 to 5. As a result of the changes to the count variables, data element management module 102 updates the distance variables including the value of the Minimum Distance and the value of the Highest Value. In this case, the value of the Highest Value is updated to a value of 5 which is the value of the count variable of the Data Element C which has the highest count variable of the data elements. In addition, data element management module 102 then adjusts the Minimum Distance variable to a value of 2 which is the result of the multiplication of the Minimum Distance factor (value of 0.5) with the Highest Value (value of 5). It should be noted that although the count variable of Data Element C now has a value of 5, data element management module 102 does not move it to a lower priority subgroup.

FIG. 3I shows a further step in the operation of Subgroup 300 with data elements of subgroups for management by electronic device 100 of FIG. 1. To further illustrate the process, data element management module 102 places four (4) new data elements to Subgroup 300. In particular, data element management module 102 places Data Element D to the bottom entry of the LRU list of Subgroup 2 and Data Element E to the top entry of the LRU list of Subgroup 2. Next, data element management module 102 places Data Element F to the bottom entry of the LRU list, Data Element G to the next entry of the LRU list, and Data Element H to the top entry of the LRU list of Subgroup 1. It should be noted that although the count variable of Data Element B now has a value of zero (0), data element management module 102 does not move it to a lower priority subgroup or delete from the subgroup.

Figure 3J:
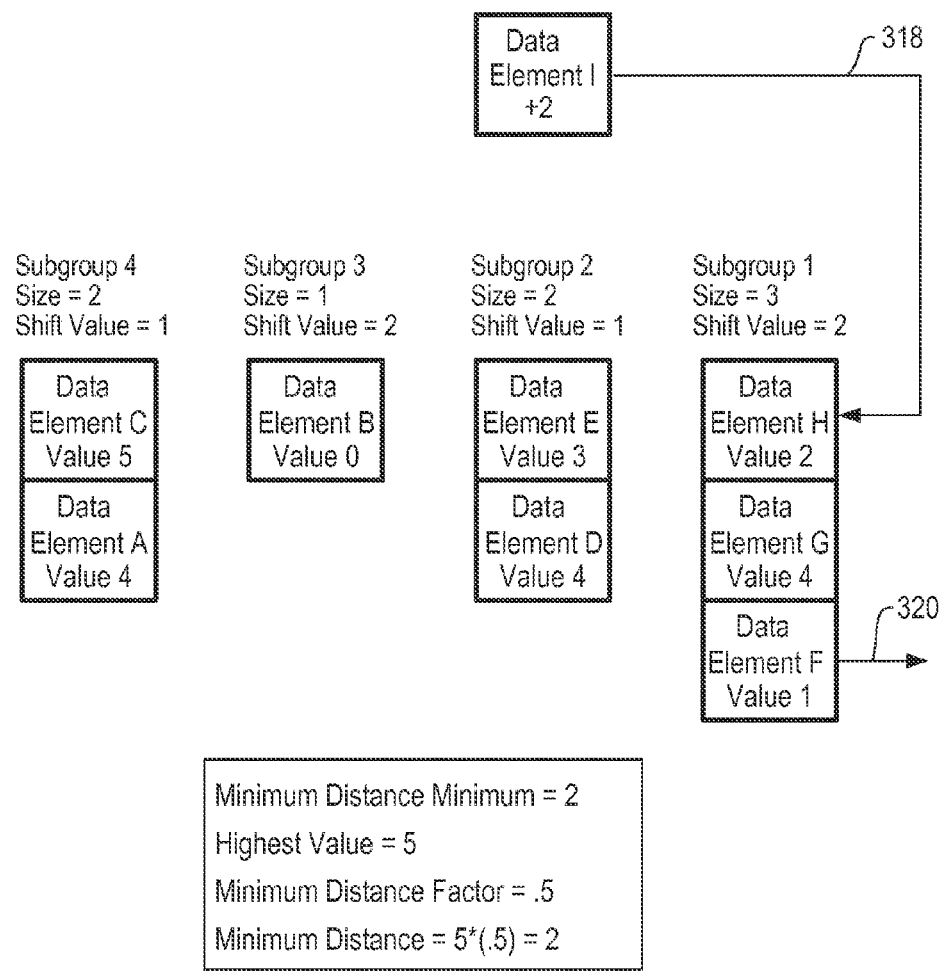

FIG. 3J shows a further step in the operation of Subgroup 300 with data elements of subgroups for management by electronic device 100 of FIG. 1. As shown, all entries of the subgroups of Subgroup 300 are full and contain data elements. The Subgroup 300 being full is for illustrative purposes and it should be understood that the techniques of the present application are applicable with Subgroup 300 not being full. When Subgroup 300 is full, data management module 102 places any new data elements to the top entry of the lower numbered (lowest priority) subgroup. To illustrate the process, data management module 102 receives Data Element I and places the Data Element to the top entry of the lowest numbered (lowest priority) Subgroup 1 (as shown by arrow 318). In this case, Data Element I has a count variable value of 2. The LRU list of Subgroup 1 operates as a least recently used data structure and thus Data Element I is placed to the top entry (most recently used space) and Data Element F is removed (as shown by arrow 320) from the bottom entry (least recently used space).

Figure 3K:
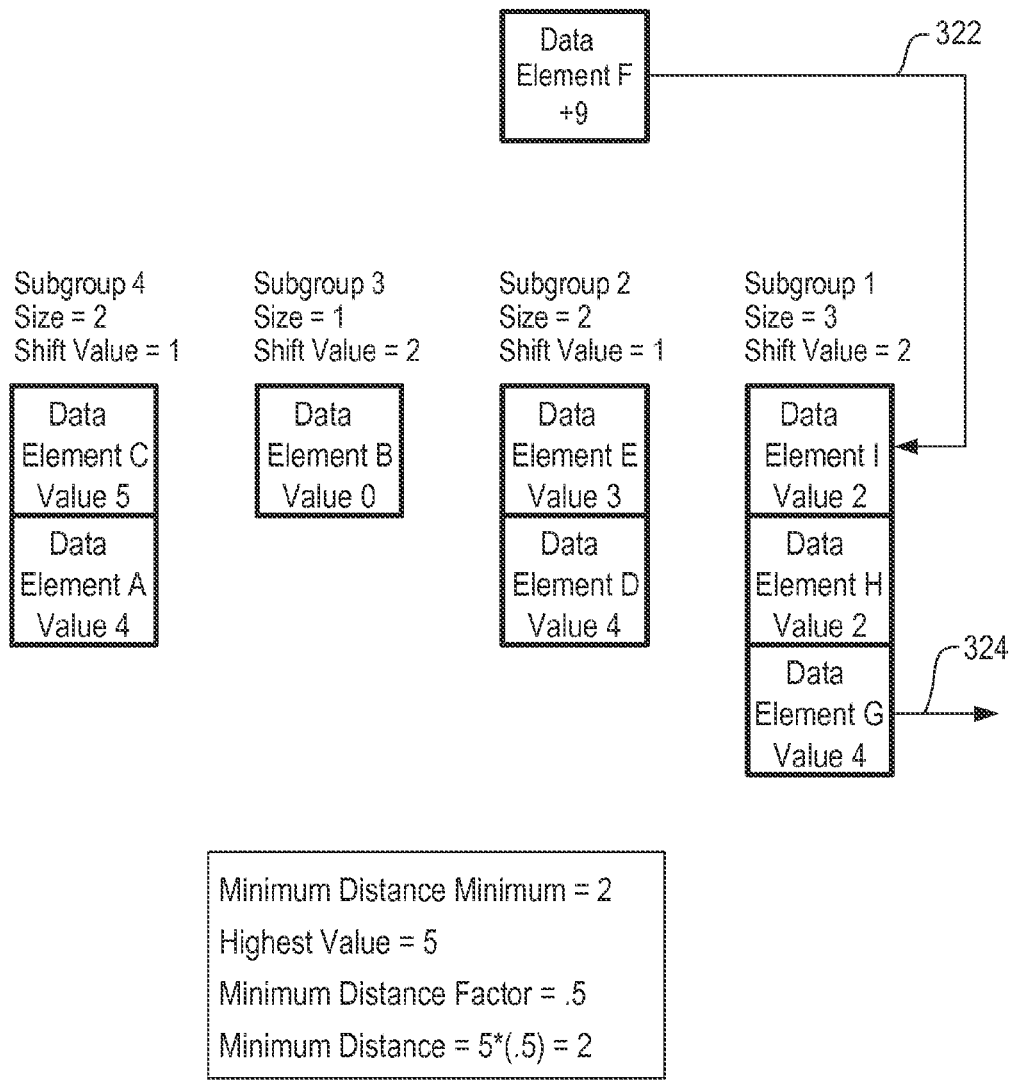

FIG. 3K shows a further step in the operation of Subgroup 300 with data element management. As shown, data element management module 102 placed Data Element I on the top entry (most recently used space) of the LRU of Subgroup 1 and removed Data Element F from the LRU list. To further illustrate the process, suppose that data element management module 102 receives Data Element F again and now has a count variable with a value of 9. As explained above, although data management module 102 had previously removed Data Element F from the LRU list of Subgroup 1, it now can place Data Element F back to Subgroup 1. In this case, data element management module 102 places Data Element F to the top entry of the lowest numbered (lowest priority) Subgroup 1 (as shown by arrow 322) and removes Data Element G (as shown by arrow 324) from the bottom entry (least recently used space) of Subgroup 1.

Figure 3L:
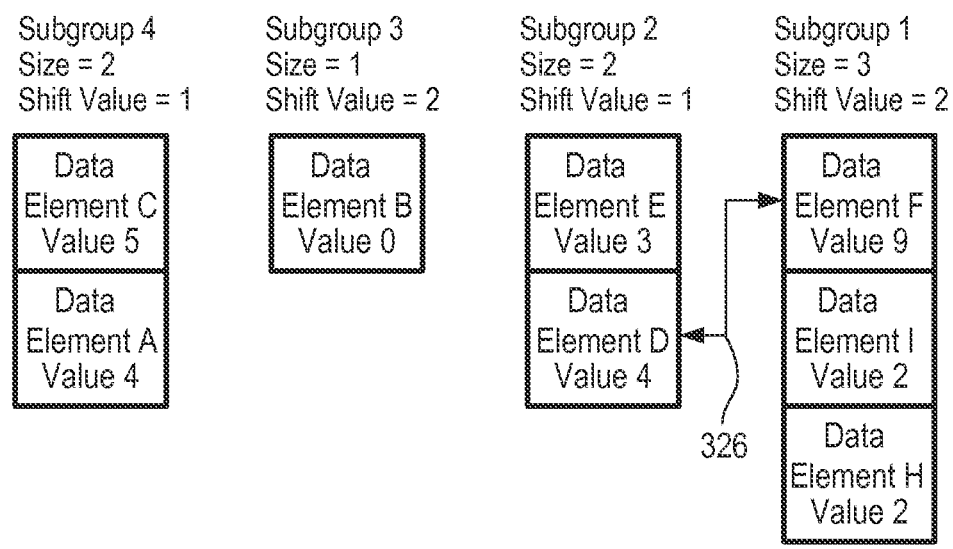

FIG. 3L shows a further step in the operation of Subgroup 300 with data elements of subgroups for management by electronic device 100 of FIG. 1. As shown, data element management module 102 placed Data Element F on the top (most recently used space) of Subgroup 1.

In this case, it is possible for data element management module 102 to compare Data Element F of Subgroup 1 to Data Element D of Subgroup 2 and thus possibly swap these two data elements (as shown by arrow 326). Although the value of the count variable of Data Element F (value 9) is greater than the value of the count variable of Data Element D (value 4), data element management module 102 takes into consideration distance factors when comparing two data elements between subgroups. For example, data element management module 102 updates the value of the Highest Value variable (value 9) to reflect the value of the count variable of the most recent data element, which, in this case, is the value of 9 of Data Element F. The data element management module 102 then adjusts the Minimum Distance variable to a value of 4 which is the result of the multiplication of the Minimum Distance factor (value of 0.5) with the Highest Value (value of 9). The data element management module 102 then proceeds to compare the value of the count variable of Data Element F (value of 9) with the total distance value of 8 (4+4) which is the combination of the value of Data Element D (value of 4) and the value of the Minimum Distance variable (value of 4). In this case, data element management determines that the value of the total distance (8=4+4) is less than the value of the count variable of Data Element F (value of 9). In this case, data element management module 102 moves Data Element F from the top entry of Subgroup 1 to the bottom entry of the LRU list of Subgroup 2 and moves Data Element D from the bottom entry of the LRU list of Subgroup 2 to the top entry of the LRU list of Subgroup 1 (as shown by arrow 326). In other words, data element management module 102 swaps Data Element F of Subgroup 1 with Data Element D of Subgroup 2. As part of the process, data element management module 102 moves Data Element F to the top entry of the LRU list of Subgroup 2 because each new data element placed in a LRU list is placed on the top entry of the LRU list.

Figure 3M:
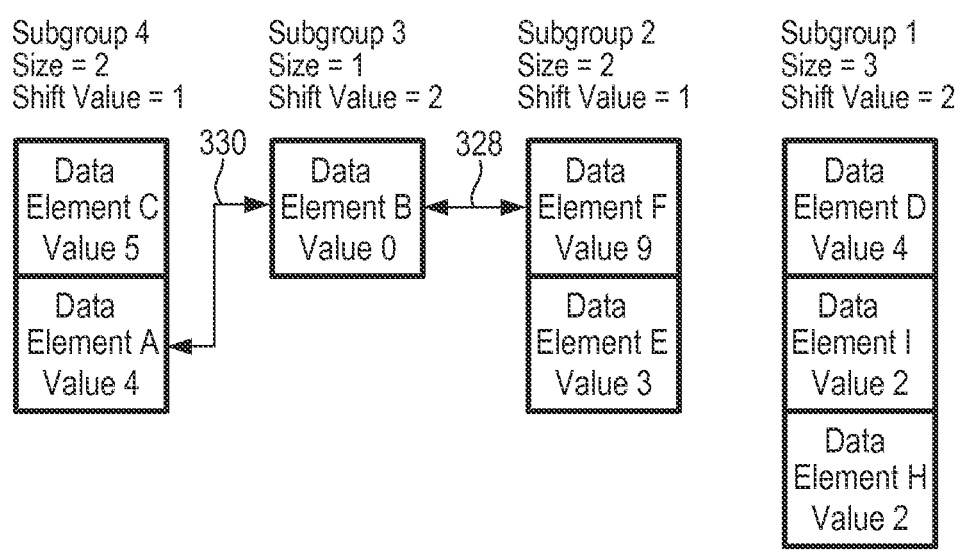

FIG. 3M shows a further step in the operation of Subgroup 300 with data elements of subgroups for management by electronic device 100 of FIG. 1. As shown, data element management module 102 moved Data Element F to the top entry of the LRU list of Subgroup 2 and moved Data Element D to the top entry of the LRU list of the Subgroup 1. In other words, when data elements are added to a subgroup, the data elements are moved up to the top entry of the subgroup because of the characteristics of a LRU list.

In this case, it is possible for data management module 102 to compare Data Element F of Subgroup 2 to Data Element B of Subgroup 3 and thus possibly swap these two data elements (as shown by arrow 328). Although the value of the count variable of Data Element F (value 9) is greater than the value of the count variable of Data Element B (value 0), data element management module 102 takes into consideration distance factors when comparing two data elements between subgroups. The data element management module 102 proceeds to compare the value of the count variable of Data Element F (value of 9) with the total distance value of 4 (0+4) which is the combination of the value of Data Element B (value of 0) and the value of the Minimum Distance variable (value of 4). In this case, data element management module 102 determines that the value of the total distance (4=0+4) is less than the value of the count variable of Data Element F (value of 9). In this case, data element management module 102 moves Data Element F from the top entry of Subgroup 2 to the bottom entry of the LRU list of Subgroup 3 and moves Data Element B from the bottom entry of the LRU list of Subgroup 3 to the top entry of the LRU list of Subgroup 2 (as shown by arrow 328). In other words, data element management module 102 swaps Data Element F of Subgroup 2 with Data Element B of Subgroup 3.

As part of the next step of the process, data element management module 102 compares Data Element F of Subgroup 3 to Data Element A of Subgroup 4 and swaps these two data elements (as shown by arrow 330) in a process similar to the above (as shown by arrow 330). In addition, data management module 102 moves Data Element F to the top entry of the LRU list of Subgroup 4 because each new data element placed in a LRU list is placed on the top entry of the LRU list, as shown below in FIG. 3N.

Figure 3N:
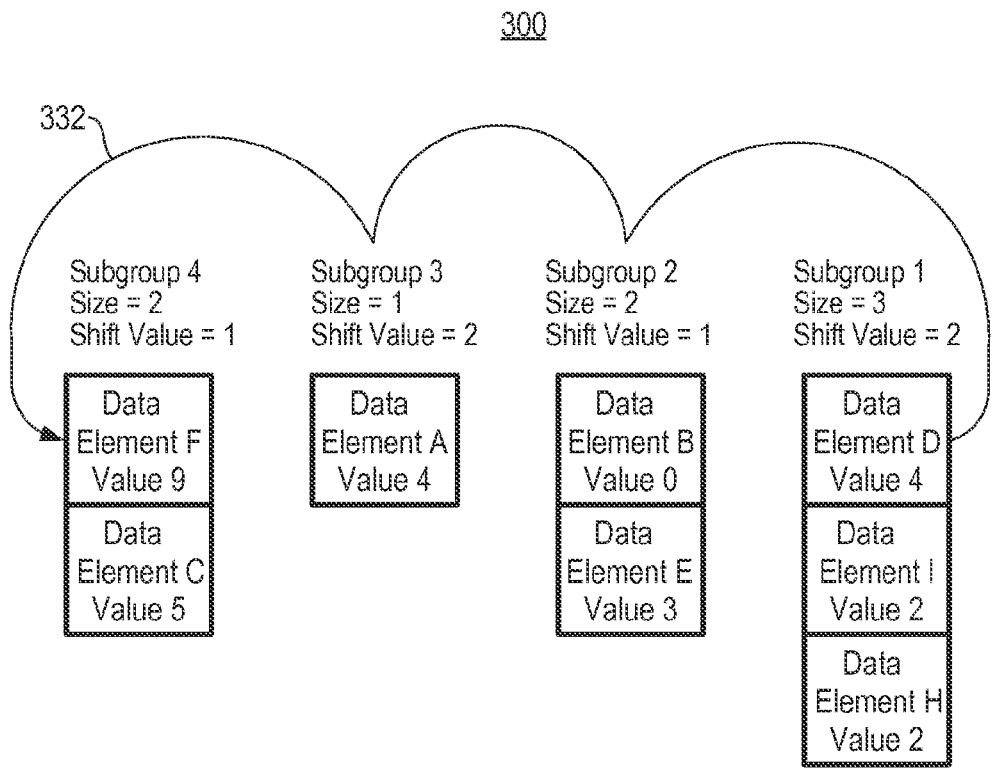
Figure 30:
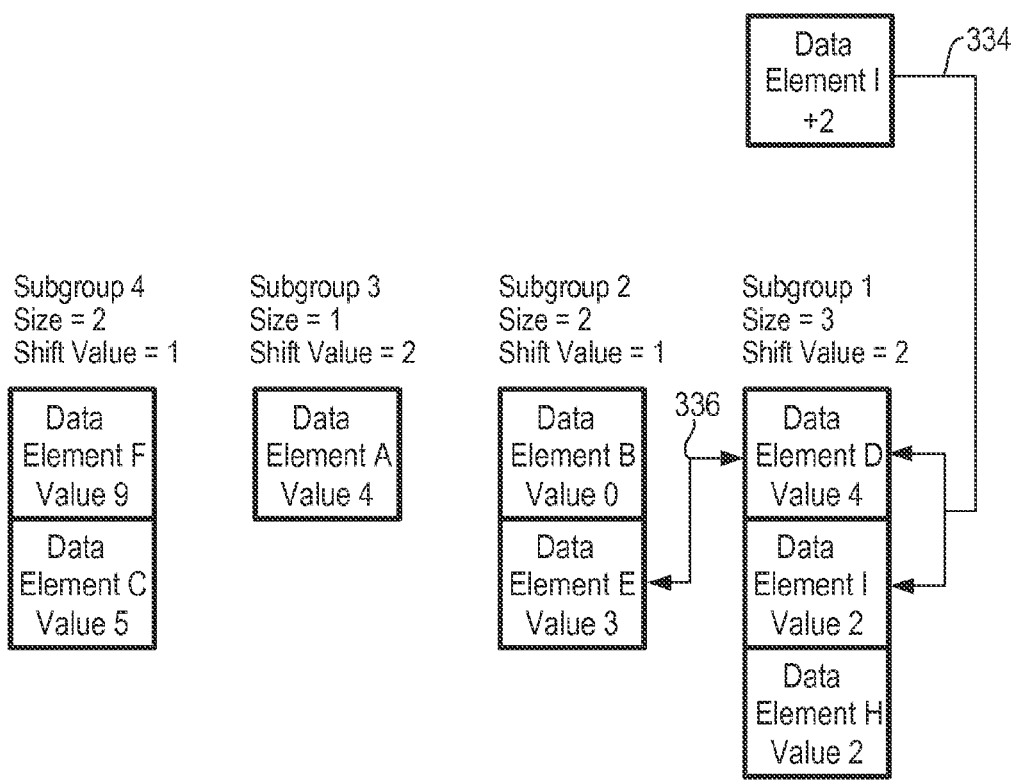

FIG. 3N shows a further step in the operation of Subgroup 300 with data elements of subgroups for management by electronic device 100 of FIG. 1. As shown, data element management module 102 moved Data Element F to the top entry of the LRU list of Subgroup 4. As explained above, data element management 102 first placed Data Element F on the top entry of Subgroup 1 and subsequently, through a series of steps or hops, moved Data Element F to Subgroup 2 and then Subgroup 3 and finally to Subgroup 4 (as shown by arrow 332). In other words, data element management module 102 moved data elements from a low priority subgroup, such as Subgroup 1, to subsequently higher priority subgroups in a series of steps or hops, such as to Subgroup 2, then Subgroup 3 and finally to Subgroup 4. In one example, these techniques can be applied to an automated tiered environment where application module 108 operates in conjunction with storage system 120. In such an example, data elements may be associated with data blocks which can be stored in different tiers of storage system 120. In this example, the movement of data elements from a lower priority subgroup to subsequently higher priority subgroups occurs one subgroup at a time. Such a technique may help reduce processing time, if the data block was valuable enough to be moved to the highest subgroup, it will be accessed again soon and then may be given the opportunity to move up. In addition, such a technique may be useful in an automated tiered environment that supports two tiers of storage.

FIG. 3O shows a further step in the operation of Subgroup 300 with data elements of subgroups for management by electronic device 100 of FIG. 1. In one example, to illustrate the process, data element management module 102 determines that Data Element I was accessed and then updates (increments) the value of the count variable of Data Element I by a value of 2 for a total value of 4. In this case, since Data Element I was accessed and the value of the Data Element I increased, data management module 102 moves Data Element I to the top entry of the LRU list of Subgroup 1 (as shown by arrow 334).

In this case, to further illustrate the process, data element management module 102 proceeds to compare Data Element I of Subgroup 1 (though not shown, Data Element I was moved to the top entry of the LRU list of Subgroup 1) to Data Element E of Subgroup 2 and thus possibly swap these two data elements (as shown by arrow 336). Although the value of the count variable of Data Element I (value 4) is greater than the value of the count variable of Data Element E (value 3), data element management module 102 takes into consideration distance factors when comparing two data elements between subgroups. The data element management module 102 proceeds to compare the value of the count variable of Data Element I (value of 4) with the total distance value of 7 (3+4) which is the combination of the value of Data Element E (value of 3) and the value of the Minimum Distance variable (value of 4). In this case, data element management module 102 determines that the value of the total distance (7=3+4) is greater than the value of the count variable of Data Element I (value of 4). In this case, data element management module 102 does not swap Data Element I of the top entry of Subgroup 1 with Data Element E from the bottom entry of Subgroup 2. In other words, data element management module 102 keeps Data Element I at the top entry of the LRU list of Subgroup 1.

FIG. 3P shows a further step in the operation of Subgroup 300 with data elements of subgroups for management by electronic device 100 of FIG. 1. As shown, and as explained above, data element management module 102 keeps Data Element I at the top entry of the LRU list of Subgroup 1. The data management module 102 did not swap Data Element I with Data Element E because of the use of the Minimum Distance variable. In other words, data element management module 102 compared the value of the count variable of Data Element I (value of 4) with the total distance value of 7 (3+4). In this case, data management module 102 determined that the value of the total distance (7=3+4) is greater than the value of the count variable of Data Element I (value of 4). In some examples, the use of the Minimum Distance variable may help reduce the occurrence of swapping data elements between subgroups when the relative difference of the count variables of the data elements is small compared to the highest value count variable of a data element. In this example, Subgroup 300 was configured to support 8 data elements for illustrative purposes. The use of these techniques including the Minimum Distance Factor and Highest Value variable may be important in systems that support large systems that support hundreds, thousands, or likely millions of data elements. Therefore, in this case, data element management module 102 did not swap Data Element C, which has a count variable value of 5, with Data Element A which has a count variable value of 4.

FIG. 3Q shows a further step in the operation of Subgroup 300 with data elements of subgroups for management by electronic device 100 of FIG. 1. Next, to illustrate the process, it is assumed that timer management module 106 executes a process to adjust by a predefined amount at the values of the count variables of the data elements of subgroups. In this case, turning to Subgroup 4, the value of the count variable of Data Element F is 9 and the timer management module 106 process proceeds to shift the value of the count variable of Data Element F by 1 bit to the right, in effect dividing the value of 9 by 2, resulting in a count variable value of 4. Continuing with the example, the value of the count variable of Data Element C is 5 and timer management module 106 process proceeds to shift the value of the count variable of Data Element C by 1 bit to the right, in effect dividing the value of 4 by 2, resulting in a count variable value of 2. In a similar manner, turning to Subgroup 3, the value of the count variable of Data Element A is 4 and timer management module 106 process proceeds to shift the value of the count variable of Data Element A by 2 bits to the right, in effect dividing the value of 4 by 4, resulting in a count variable value of 1. Likewise, turning to Subgroup 2, the value of the count variable of Data Element B is zero (0) and timer management module 106 process proceeds to shift the value of the count variable of Data Element B by 1 bit to the right, in effect dividing the value of zero (0) by 2, resulting in a count variable value of zero (0). Likewise, the value of the count variable of Data Element E is 3 and timer management module 106 process proceeds to shift the value of the count variable of Data Element E by 1 bit to the right, in effect dividing the value of 3 by 2, resulting in a count variable value of 1. The values of the count variable of data elements of Subgroup 1 are updated in a similar manner as above.

As a result of timer management module 106 operation above, the count variable of Data Element F has been updated to a value of 4, Data Element C has been updated to a value of 2, Data Element A has been updated to a value of 1, Data Element B has been updated to a value of zero (0), Data Element E has been updated to a value of 1, Data Element D has been updated to a value of 1, Data Element has been updated to a value of zero (0), and Data Element H has been updated to a value of zero (0). As a result of the changes to the count variables, data element management module 102 updates the value of the Minimum Distance and the value of the Highest Value. In this case, the value of the Highest Value is updated to a value of 4 which is the value of the count variable of the Data Element F which has the highest count variable of the data elements. In addition, data element management module 102 then adjusts the Minimum Distance variable to a value of 2 which is the result of the multiplication of the Minimum Distance factor (value of 0.5) with the Highest Value (value of 4).

Now, suppose, to illustrate, that the data elements of Subgroup 300 have not been accessed for some period of time such that timer management module 106 executes the update process upon expiration of the time period. In this case, the values of the count variables would not be adjusted further because doing so would decrease the value of the highest value down to 2. If this were allowed to occur, then value of the Minimum Distance variable would to decrease to 1 which would below the value of Minimum Distance Minimum variable of 2. Furthermore, the techniques of the present application may help reduce occurrence of adjustment of values of count variables of data element such that value of the Minimum Distance variable does not decrease below a threshold so that a set of data elements does not lose its sort process if the data elements are subject to periods of inactivity. For example, in an automated tiered environment, there may be periods of inactivity such as in the evening. In this case, if timer management module 106 were allowed to expire and execute the data element update operation, it may be possible that all the values of the count variables would be reduced to zero (0). Then, this may cause a large amount thrashing to occur when normal activity resumes.

Figure 4:
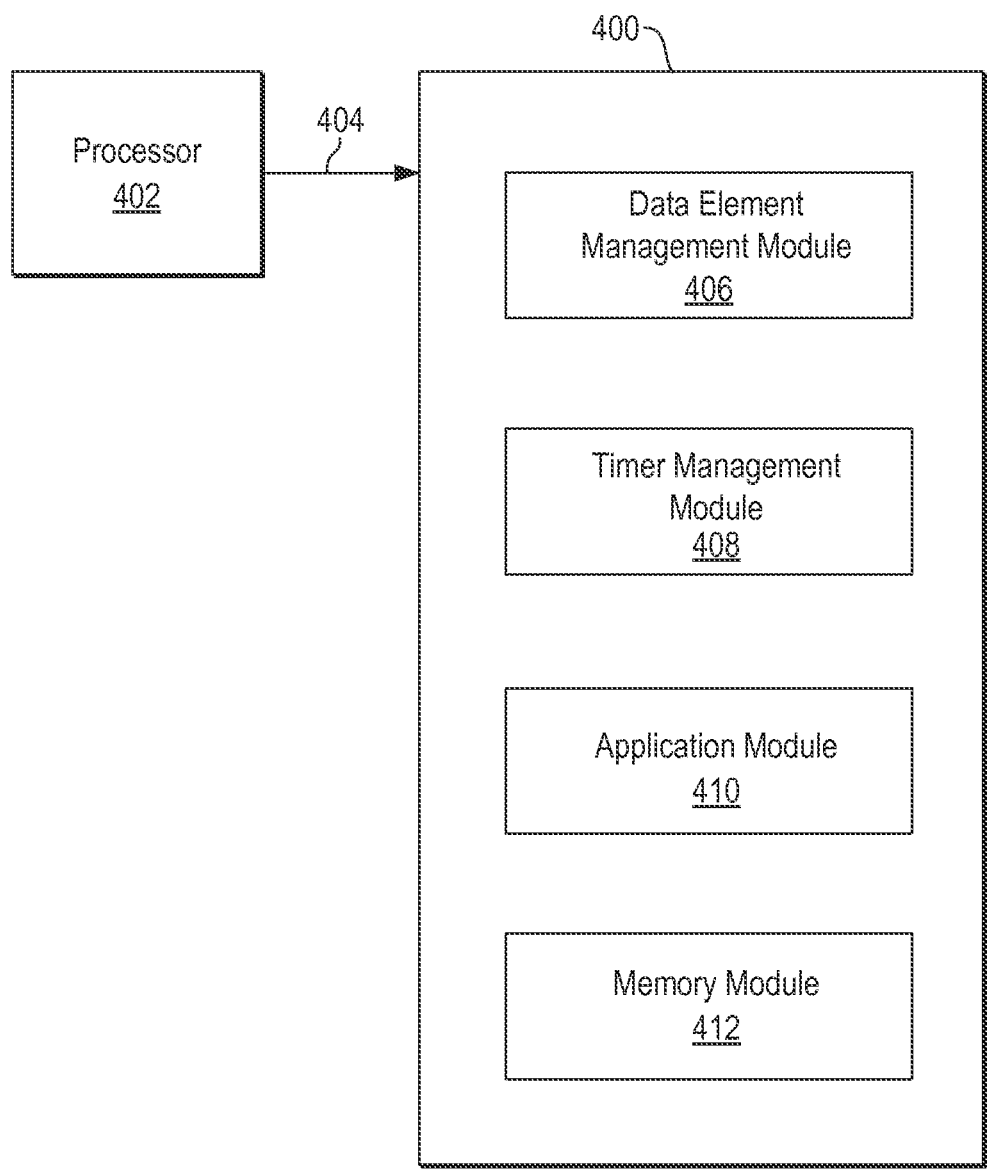
FIG. 4 is an example block diagram showing a non-transitory, computer-readable medium that stores instructions for management of data elements of subgroups.

FIG. 4 is an example block diagram showing a non-transitory, computer-readable medium that stores instructions for managing data elements of subgroups. The non-transitory, computer-readable medium is generally referred to by the reference number 400 and may be included in electronic device 100 as described as related to FIG. 1. The non-transitory, computer-readable medium 400 may correspond to any typical storage device that stores computer-implemented instructions, such as programming code or the like. For example, the non-transitory, computer-readable medium 400 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, solid state drives and flash memory devices.

A processor 402 generally retrieves and executes the instructions stored in the non-transitory, computer-readable medium 400 to operate the electronic device in accordance with an example. In an example, the tangible, machine-readable medium 400 can be accessed by the processor 402 over a bus 404. A first region 406 of the non-transitory, computer-readable medium 400 may include functionality to implement data element management module 102 as described herein. A second region 408 of the non-transitory, computer-readable medium 400 may include functionality to implement timer management module 106 as described herein. A third region 410 of the non-transitory, computer-readable medium 400 may include functionality to implement application module 108 as described herein. A fourth region 412 of the non-transitory, computer-readable medium 400 may include functionality to implement memory module 112 as described herein.

Although shown as contiguous blocks, the software components can be stored in any order or configuration. For example, if the non-transitory, computer-readable medium 400 is a hard drive, the software components can be stored in non-contiguous, or even overlapping, sectors.

What is claimed is:

1. An electronic device to manage data elements, comprising:
   a memory module to store a plurality of data structures to store data elements; and
   a data element management module implemented by instructions stored in a non-transitory, computer-readable medium, the data element management module to:
   configure the plurality of data structures as a plurality of subgroups, wherein the subgroups are to have least recently used (LRU) lists of data elements, wherein the data elements are to be associated with count variables, and wherein the LRU lists are to have a top entry to store a most recently used data element and a bottom entry to store a least recently used data element;
   if a data element is accessed, then increase the value of the count variable of the accessed data element and move the accessed data element to the top entry of the LRU list of the subgroup associated with the data element; and
   if the value of the count variable of the accessed data element of the top entry is greater than a value of a count variable of a data element of a bottom entry of a LRU list of another subgroup having a relative higher priority for processing than the subgroup of the accessed data element, then swap the data element of the bottom entry with the accessed data element of the top entry.

2. The electronic device of claim 1, further comprising a timer management module implemented by instructions stored in a non-transitory, computer-readable medium, the timer management module to periodically execute a process upon expiration of a time period, wherein the process comprises adjusting by a predefined amount at least one of the values of the count variables of the data elements of subgroups.

3. The electronic device of claim 1, further comprising a timer management module implemented by instructions stored in a non-transitory, computer-readable medium, the timer management module to periodically execute a process upon expiration of a time period, wherein the process comprises decreasing by a predefined amount at least one of the values of the count variables of the data elements of subgroups.

4. The electronic device of claim 1, further comprising a timer management module implemented by instructions stored in a non-transitory, computer-readable medium, the timer management module to periodically execute a process upon expiration of a time period, wherein the process comprises decreasing by different predefined amounts at least one of the values of the count variables of the data elements of different subgroups.

5. The electronic device of claim 1, further comprising a timer management module implemented by instructions stored in a non-transitory, computer-readable medium, the timer management module to periodically execute a process upon expiration of a time period, wherein the process comprises decreasing by a predefined amount at least one of the values of the count variables of the data elements of subgroups, wherein the values of count variables of data elements of higher priority subgroups are to be decreased by a higher amount relative to values of count variables of data elements of lower priority subgroups.

6. The electronic device of claim 1, wherein the data element management module is configured to compare data elements of subgroups based on a minimum distance factor, which is based on a percentage of highest values of the count variables of the data elements.

7. The electronic device of claim 1, wherein the data elements are associated with data blocks to be stored in storage systems.

8. The electronic device of claim 1, wherein the data elements are associated with data blocks, and wherein the data blocks of higher priority subgroups are to be stored in faster access storage systems relative to data blocks of lower priority subgroups, which are to be stored in slower access storage systems.

9. A method of managing data elements in an electronic device, the method comprising:
   configuring a plurality of data structures as a plurality of subgroups, each of the subgroups to have a least recently used (LRU) list of data elements, wherein the data elements are to be associated with count variables, wherein the LRU lists are to have a top entry to store a most recently used data element and a bottom entry to store a least recently used data element;

if a data element is accessed, then increasing the value of the count variable and moving the accessed data element to the top entry of the LRU list of the subgroup associated with the data element; and if the value of the count variable of the accessed data element of the top entry is greater than a value of a count variable of a data element of a bottom entry of a LRU list of another subgroup having a relative higher priority for processing than the subgroup of the accessed data element, then swapping the data element of the bottom entry with the accessed data element of the top entry.

10. The method of claim 9, further comprising periodically executing a process upon expiration of a time period by adjusting by a predefined amount the value of the count variables of the data elements of subgroups.

11. The method of claim 9, further comprising periodically executing a process upon expiration of a time period by increasing by a predefined amount the value of the count variables of the data elements of subgroups.

12. The method of claim 9, further comprising periodically executing a process upon expiration of a time period by increasing by a different predefined amount the value of the count variables of the data elements of different subgroups.

13. The method of claim 9, further comprising periodically executing a process upon expiration of a time period to increase by a predefined amount the values of the count variables of the data elements of subgroups, wherein the values of count variables of data elements of higher priority subgroups are to be increased by a higher amount relative to the values of count variables of data elements of lower priority subgroups.

14. The method of claim 9, further comprising comparing data elements of subgroups based on a minimum distance factor, which is defined as a percentage of a highest value of the count variable of the data elements.

15. The method of claim 9, wherein the data elements represent data blocks, and the data blocks of higher priority subgroups are to be stored in faster access storage systems relative to data blocks of lower priority subgroups, which are to be stored in slower access storage systems.

16. A non-transitory computer-readable medium having computer executable instructions stored thereon to manage data elements, the instructions are executable by a processor to:

configure a plurality of data structures as a plurality of subgroups, each of the subgroups to have a least recently used (LRU) list of data elements, each of the data elements to be associated with a count variable, each of the of LRU lists to have a top entry to store a most recently used data element and a bottom entry to store a least recently used data element;

if a data element is accessed, then increase a value of the count variable and move the accessed data element to the top entry of the LRU list of the subgroup associated with the data element; and if the value of the count variable of the accessed data element of the top entry is greater than a value of a count variable of a data element of a bottom entry of a LRU list of another subgroup having a relative higher priority for processing than the subgroup of the accessed data element, then swap the data element of the bottom entry with the accessed data element of the top entry.

17. The non-transitory computer-readable medium of claim 16, further comprising instructions to periodically execute a process upon expiration of a time period to adjust by a predefined amount the value of the count variables of the data elements of subgroups.

18. The non-transitory computer-readable medium of claim 16, further comprising instructions to periodically execute a process upon expiration of a time period to increase by a different predefined amount the value of the count variables of the data elements of different subgroups.

19. The non-transitory computer-readable medium of claim 16, further comprising instructions to periodically execute a process upon expiration of a time period to increase by a predefined amount the values of the count variables of the data elements of subgroups, wherein the values of count variables of data elements of higher priority subgroups are to be increased by a higher amount relative to the values of count variables of data elements of lower priority subgroups.

20. The non-transitory computer-readable medium of claim 16, wherein the data elements represent data blocks, and the data blocks of higher priority subgroups are to be stored in faster access storage systems relative to data blocks of lower priority subgroups, which are to be stored in slower access storage systems.

* * * * *

UNITED STATES PATENT AND TRADEMARK OFFICE
CERTIFICATE OF CORRECTION

PATENT NO. : 8,990,524 B2
APPLICATION NO. : 13/628474
DATED : March 24, 2015
INVENTOR(S) : Mykel John Kramer Page 1 of 1

It is certified that error appears in the above-identified patent and that said Letters Patent is hereby corrected as shown below:

In the Claims

In column 22, line 5, in Claim 16, delete "of LRU" and insert -- LRU --, therefor.

Signed and Sealed this
Twenty-eighth Day of July, 2015

Michelle K. Lee
*Director of the United States Patent and Trademark Office*